US010610439B2

(12) United States Patent
Ohta et al.

(10) Patent No.: US 10,610,439 B2
(45) Date of Patent: Apr. 7, 2020

(54) ASSISTANCE APPARATUS

(71) Applicant: JTEKT CORPORATION, Osaka-shi (JP)

(72) Inventors: Hiromichi Ohta, Kariya (JP); Toshiki Kumeno, Kyoto (JP)

(73) Assignee: JTEKT CORPORATION, Osaka-shi (JP)

( * ) Notice: Subject to any disclaimer, the term of this patent is extended or adjusted under 35 U.S.C. 154(b) by 187 days.

(21) Appl. No.: 15/723,568

(22) Filed: Oct. 3, 2017

(65) Prior Publication Data

US 2018/0092792 A1 Apr. 5, 2018

(30) Foreign Application Priority Data

Oct. 3, 2016 (JP) ................................. 2016-195822
Dec. 27, 2016 (JP) ................................. 2016-253235

(51) Int. Cl.

| G06F 19/00 | (2018.01) |
|---|---|
| A61H 1/02 | (2006.01) |
| B25J 9/00 | (2006.01) |
| A61H 3/00 | (2006.01) |

(Continued)

(52) U.S. Cl.
CPC ............. *A61H 1/0244* (2013.01); *A61H 3/00* (2013.01); *B25J 9/0006* (2013.01); *B25J 9/1633* (2013.01); *B25J 13/085* (2013.01); *A61H 2201/1652* (2013.01); *A61H 2201/1676* (2013.01); *A61H 2201/5061* (2013.01); *A61H 2201/5069* (2013.01); *A61H 2201/5092* (2013.01); *A61H 2201/5097* (2013.01); *A61H 2230/00* (2013.01)

(58) Field of Classification Search
CPC .... A61H 1/0244; A61H 3/00; A61H 2230/00; A61H 2201/1676; A61H 2201/1652; A61H 2201/5092; A61H 2201/5061; A61H 2201/5097; A61H 2201/5069; B25J 13/085; B25J 9/1633; B25J 9/0006
See application file for complete search history.

(56) References Cited

U.S. PATENT DOCUMENTS

| 6,471,664 B1 * | 10/2002 | Campbell ............. A61F 5/0123 |
|---|---|---|
| | | 602/16 |
| 7,517,330 B2 * | 4/2009 | Deharde ................ A61F 5/0125 |
| | | 602/16 |

(Continued)

FOREIGN PATENT DOCUMENTS

JP 2013-173190 9/2013

*Primary Examiner* — Ian Jen
(74) *Attorney, Agent, or Firm* — Oblon, McClelland, Maier & Neustadt, L.L.P.

(57) ABSTRACT

An assistance apparatus includes: a body brace; an output link to be put on an assistance subject body part, the output link pivoting about a joint in the assistance subject body part; an actuator including an output shaft that generates an assistance torque; a torque detection section provided at any position on the way from the output link to the output shaft (of the actuator); torque determination section for determining a combined torque that is a combination of a subject person torque input from the output link as a result of a subject person making the assistance subject body part pivot with the subject person's own strength and the assistance torque from the output shaft; and a controller that controls a rotational angle of the output shaft based on the combined torque.

14 Claims, 19 Drawing Sheets

(51) Int. Cl.
*B25J 9/16* (2006.01)
*B25J 13/08* (2006.01)

(56) References Cited

U.S. PATENT DOCUMENTS

| | | | | |
|---|---|---|---|---|
| 7,578,799 | B2* | 8/2009 | Thorsteinsson | A61B 5/1038 |
| | | | | 602/16 |
| 8,968,227 | B2* | 3/2015 | Rokosz | A61F 5/0125 |
| | | | | 601/35 |
| 9,868,204 | B2* | 1/2018 | Seo | B25J 9/0006 |
| 10,137,049 | B2* | 11/2018 | Lee | A61H 3/00 |
| 10,195,736 | B2* | 2/2019 | Barnes | B25J 9/0006 |
| 2009/0076618 | A1* | 3/2009 | Auberger | A61F 2/64 |
| | | | | 623/18.11 |
| 2009/0292369 | A1* | 11/2009 | Kazerooni | A61H 3/00 |
| | | | | 623/27 |
| 2010/0094188 | A1* | 4/2010 | Goffer | B25J 9/0006 |
| | | | | 602/23 |
| 2014/0100492 | A1* | 4/2014 | Nagasaka | A61H 3/061 |
| | | | | 601/34 |
| 2014/0276261 | A1* | 9/2014 | Caires | A61H 1/024 |
| | | | | 601/33 |
| 2014/0276265 | A1* | 9/2014 | Caires | A61H 3/00 |
| | | | | 601/34 |
| 2015/0025423 | A1* | 1/2015 | Caires | A61H 1/024 |
| | | | | 601/35 |
| 2015/0209214 | A1* | 7/2015 | Herr | A61H 3/00 |
| | | | | 623/27 |
| 2015/0209215 | A1* | 7/2015 | Lee | A61H 1/0237 |
| | | | | 623/27 |
| 2015/0272809 | A1* | 10/2015 | Accoto | A61H 1/0237 |
| | | | | 623/31 |

* cited by examiner

ASSISTANCE APPARATUS

INCORPORATION BY REFERENCE

The disclosure of Japanese Patent Application No. 2016-195822 filed on Oct. 3, 2016 and Japanese Patent Application No. 2016-253235 filed on Dec. 27, 2016, each including the specification, drawings and abstract, is incorporated herein by reference in its entirety.

BACKGROUND

1. Technical Field

The present disclosure relates to an assistance apparatus to be put on an assistance subject body part of a subject person to assist movement of the assistance subject body part.

2. Description of Related Art

For example, Japanese Patent Application Publication No. 2013-173190 describes a body-worn motion support apparatus that when a subject person lifts a heavy object up via bending and stretching of his/her waist or a subject person walks normally, assists movement of the thighs relative to the waist. The body-worn motion support apparatus includes a waist frame to be put on the waist of a subject person, a back rest portion, an abdomen rest portion, a connection member connecting the back rest portion and the abdomen rest portion, a thigh fixation portion to be fixed to the thighs, and a drive mechanism that drives the thigh fixation portion relative to the waist frame. The body-worn motion support apparatus further includes biosignal detection sensors to be attached to the skin of the subject person, and a control section that controls the drive mechanism based on biosignal outputs from the biosignal detection sensors. In order to detect a biopotential signal such as a myogenic potential signal or a neurotransmission signal from the skin, each biosignal detection sensor includes an electrode for detecting a weak potential. The biosignal detection sensors are attached to the skin of the wearer on, e.g., the front sides of the right and left thighs near the waist of the wearer, the inner sides of the right and left thighs near the waist, the right and left buttocks and right and left parts of the back just above the waist, via respective adhesion seals covering the respective electrodes.

SUMMARY

The body-worn motion support apparatus described in JP 2013-173190 A requires a multitude of biosignal detection sensors, and the biosignal detection sensors need to be attached to very many sites, such as the front sides of the right and left thighs, the inner sides of the right and left thighs, the right and left buttocks and right and left part of the back, of a wearer. Therefore, it takes a lot of trouble to wear the body-worn motion support apparatus for use. Also, before attachment of the biosignal detection sensors, it also takes a lot of trouble to determine positions at which the biosignal detection sensors are to be attached and the number of biosignal detection sensors to be attached (e.g., three adjacent sensors are attached to one measurement site). Also, processing for removing noise from a weak biosignal from each of the multitude of biosignal detection sensors and processing for guessing what motion the wearer is being made (e.g., the wearer is lifting up a heavy object or is walking) based on the biosignals from the respective biosignal detection sensors and assisting the motion are likely to be very complicated.

The present disclosure provides an assistance apparatus that can easily be worn with no need for attachment of a multitude of sensors to the skin of a subject person and can assist movement of an assistance subject body part with a simpler configuration and simple control.

A first embodiment of the present disclosure provides an assistance apparatus including: a body brace configured to be put on the periphery of an assistance subject body part of a subject person; an output link configured to be put on the assistance subject body part and pivot about a joint in the assistance subject body part; an actuator including an output shaft that generates an assistance torque for assisting pivoting of the assistance subject body part via the output link; a torque detection section provided at any position on the way from the output link to the output shaft; a torque calculation section; and a controller. The torque calculation section is configured to determine a combined torque that is a combination of a subject person torque input from the output link as a result of the subject person making the assistance subject body part pivot with the subject person's own strength and the assistance torque from the output shaft. The controller is configured to control a rotational angle of the output shaft based on the combined torque determined using the torque calculation section.

According to the above configuration, the controller determines a combined torque that is a combination of a subject person torque and an assistance torque, via the torque calculation section that determines the combined torque, and controls the rotational angle of the output shaft based on the combined torque. Also, the torque detection section is provided at any position on the way from the output link to the output shaft. In this case, there is no need to attach the torque detection section to the skin of the subject person, and thus, it is very easy to wear the assistance apparatus in comparison with those in which a multitude of sensors are attached to the skin of a subject person. Also, a motion of the subject person can properly be detected by the torque calculation section with no need to provide a multitude of sensors, enabling provision of a simpler configuration. Also, assisting the determined motion of the subject person enables assisting movement of the assistance subject body part with simpler control. Then, a torque from the subject person (subject person torque) and a torque from the actuator (assistance torque) can separately be calculated, enabling the control to be performed based on the torque from the subject person, and thus enabling reduction in the subject person's feeling of discomfort (output from the actuator not intended by the subject person).

In the above assistance apparatus according to the first embodiment, the torque detection section may include an output shaft rotational angle sensor configured to detect an output shaft rotational angle that is a rotational angle of the output shaft, an elastic body, and an output link pivotal angle detection sensor configured to detect an output link pivotal angle that is a pivotal angle of the output link. The controller may be configured to control the output shaft rotational angle based on the combined torque determined using the torque calculation section and the output link pivotal angle detected using the output link pivotal angle sensor.

According to the above configuration, the torque detection section includes the output shaft rotational angle sensor, the elastic body and the output link pivotal angle sensor, enabling provision of the specific and proper torque detection section.

In the above assistance apparatus according to the first embodiment, the torque detection section may include at least one of a current sensor configured to detect a drive current for the actuator and a rotation speed sensor configured to detect a rotation speed of the actuator. The torque calculation section may be configured to detect the assistance torque based on at least one of the drive current detected using the current sensor and the rotation speed detected using the rotation speed sensor, and calculate the subject person torque based on the combined torque and the assistance torque.

According to the above configuration, the torque detection section further includes at least one of the current sensor and the rotation speed sensor, and the torque calculation section detects an assistance torque based on at least one of the drive current and the rotation speed. Therefore, the torque calculation section can (directly) detect a combined torque and an assistance torque, enabling calculation of a subject person torque with higher accuracy.

In the above assistance apparatus according to the first embodiment, the torque calculation section may be a calculation section in the controller, and the controller may be configured to calculate the combined torque based on the output link pivotal angle, the output shaft rotational angle and a state of the elastic body.

According to the above configuration, the torque calculation section can be provided with a very simple configuration, enabling very simple arithmetic calculation of a combined torque.

In the above assistance apparatus according to the first embodiment, the controller may be configured to calculate a subject person torque-related amount related to the subject person torque from the determined combined torque, calculate the assistance torque according to the calculated subject person torque-related amount, calculate the output shaft rotational angle based on the calculated assistance torque, and control the actuator so as to achieve the calculated output shaft rotational angle.

According to the above configuration, a subject person torque-related amount is calculated from a combined torque that is a combination of a subject person torque and an assistance torque, and thus, there is no need to separately determine the subject person torque and the assistance torque, enabling provision of a simpler configuration.

In the above assistance apparatus according to the first embodiment, the controller may be configured to calculate the assistance torque based on a torque obtained by multiplying the subject person torque-related amount by a predetermined multiplying factor. The above assistance apparatus according to the first embodiment further may include an assistance multiplying factor varying section configured to vary the predetermined multiplying factor.

According to the above configuration, the assistance apparatus includes the assistance multiplying factor varying section and an assistance force can properly be adjusted according to, e.g., a body condition of the subject person, which is very convenient in, e.g., rehabilitation.

In the above assistance apparatus according to the first embodiment, the elastic body may be a spiral spring, the output shaft nay be connected to one end of the spiral spring, and the output link may be connected to another end of the spiral spring directly or via a predetermined member.

According to the above configuration, as a result of the use of the spiral spring, it is sufficient to just adjust an expansion/contraction amount of the spiral spring (in other words, the rotational angle of the motor output shaft) compared to a case where an output torque of a motor is adjusted by current, enabling easier adjustment of an assistance torque.

In the above assistance apparatus according to the first embodiment, the predetermined member may be a reducer configured to reduce a speed of rotation output from the spiral spring and transmit the rotation with the reduced speed to the output link, and the torque calculation section may determine the combined torque between the output link and the reducer or the combined torque stored in the spiral spring.

According to the above configuration, the provision of the reducer that reduces a speed of rotation output from the spiral spring and transmit the reduced rotation to the output link enables use of a spiral spring having a smaller spring constant compared to a case where no reducer is provided. Consequently, a small and light spiral spring can be used, and fine adjustment of an assistance torque becomes easy (where the spring constant is large, even a small expansion/contraction error is output as a large assistance torque error). Then, a combined torque between the output link and the reducer or a combined torque stored in the spiral spring is calculated in the torque calculation section, enabling proper determination of a combined torque that is a combination of a subject person torque and an assistance torque.

In the above assistance apparatus according to the first embodiment, the controller may be configured to i) determine the combined torque and calculate the output shaft rotational angle and control the actuator so as to achieve the calculated output shaft rotational angle, at a calculation timing that comes at a predetermined time interval set in advance, and ii) calculate, at a present calculation timing, a present assistance torque that is an assistance torque at the present calculation timing based on a deviation between a present combined torque that is a combined torque determined at the present calculation timing and a last combined torque that is a combined torque determined at a last calculation timing, a last assistance torque that is an assistance torque calculated at the last calculation timing, and the predetermined multiplying factor.

In the above configuration, an assistance torque at a last calculation timing is regarded as constant until output of a new assistance torque at a present calculation timing. Therefore, the deviation between a combined torque at the last calculation timing and a combined torque at the present calculation timing can be regarded as a variation amount of a subject person torque input from the subject person. Therefore, a value obtained by multiplying the torque deviation by a predetermined multiplying factor is added to the last assistance torque, enabling proper and easy calculation of the present assistance torque. Therefore, simpler control can be performed. Also, there is no need to separately determine a subject person torque and an assistance torque, enabling provision of a simpler configuration.

In the above assistance apparatus according to the first embodiment, the elastic body may be a spiral spring, the output shaft may be connected to one end of the spiral spring, a reducer configured to reduce a speed of rotation output from the spiral spring and transmit the rotation with the reduced speed to the output link may be connected to another end of the spiral spring. The controller may be configured to calculate the output shaft rotational angle based on the present assistance torque, a reduction ratio of the reducer, a spring constant of the spiral spring and the output link pivotal angle.

According to the above configuration, an assistance apparatus with a simpler configuration can be provided in comparison with a case where what motion is being made is guessed based on biosignals from a multitude of biosignal detection sensors. Also, a subject person torque input from the subject person is determined to assist the subject person torque, and thus, there is no need to distinguish among motions of the subject person such as bending of the waist, walking and raising and lowering of the arms. Therefore, movement of the assistance subject body part can be assisted with simpler control in comparison with a case where control is performed based on biosignals from a multitude of biosignal detection sensors.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
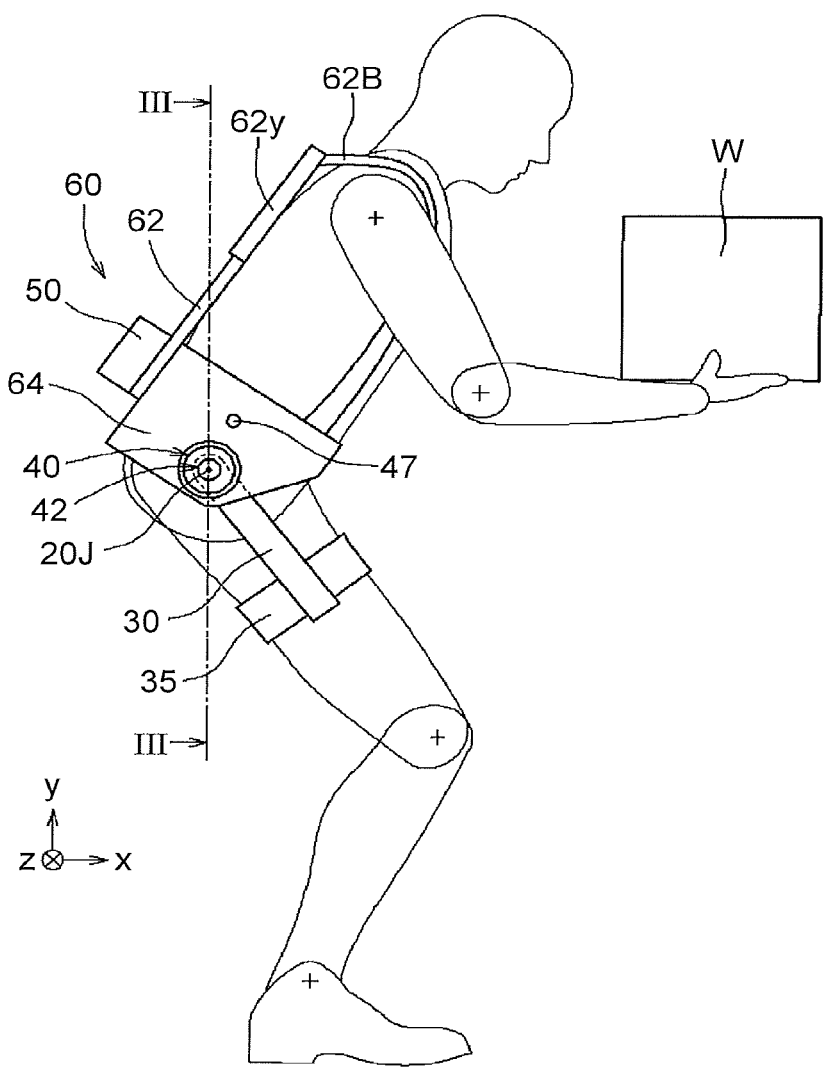
FIG. 1 is a schematic side view illustrating a state of use of an assistance apparatus according to a first embodiment.

An assistance apparatus 60 according to a first embodiment will be described below with reference to FIGS. 1 to 8. As illustrated in FIG. 1, the assistance apparatus 60 according to the first embodiment is an apparatus that when a person lifts a parcel W up, assists pivoting of the thighs relative to the waist. Here, the x direction, the y direction and the z direction indicated in the figures are orthogonal to one another, and correspond to a forward direction, an upward direction and a leftward direction of a person wearing the assistance apparatus 60, respectively.

First, a configuration of the assistance apparatus 60 will be described with reference to FIGS. 1 to 4.

Figure 2:
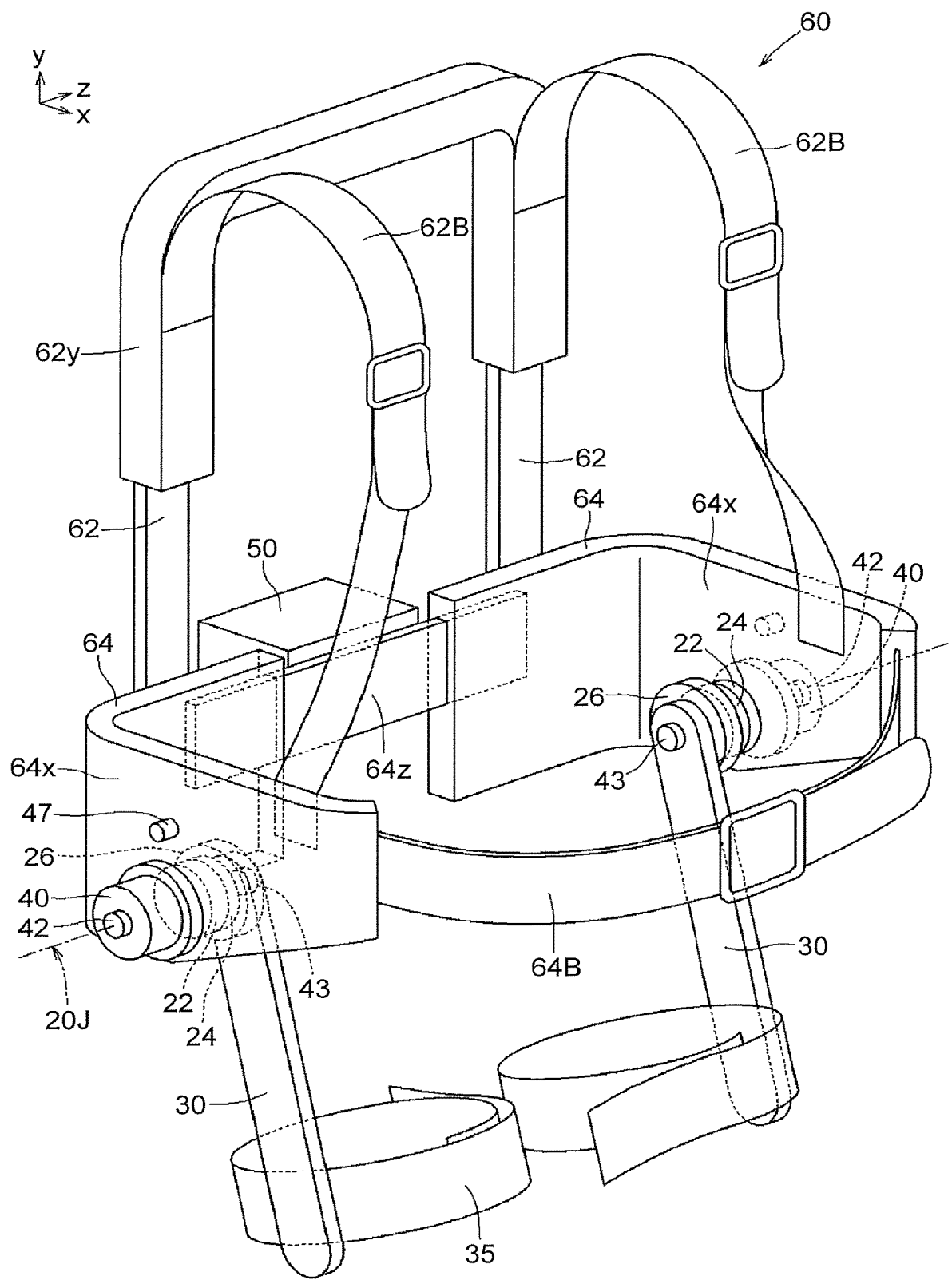
FIG. 2 is a perspective view illustrating an outer appearance of the assistance apparatus illustrated in FIG. 1.
Figure 3:
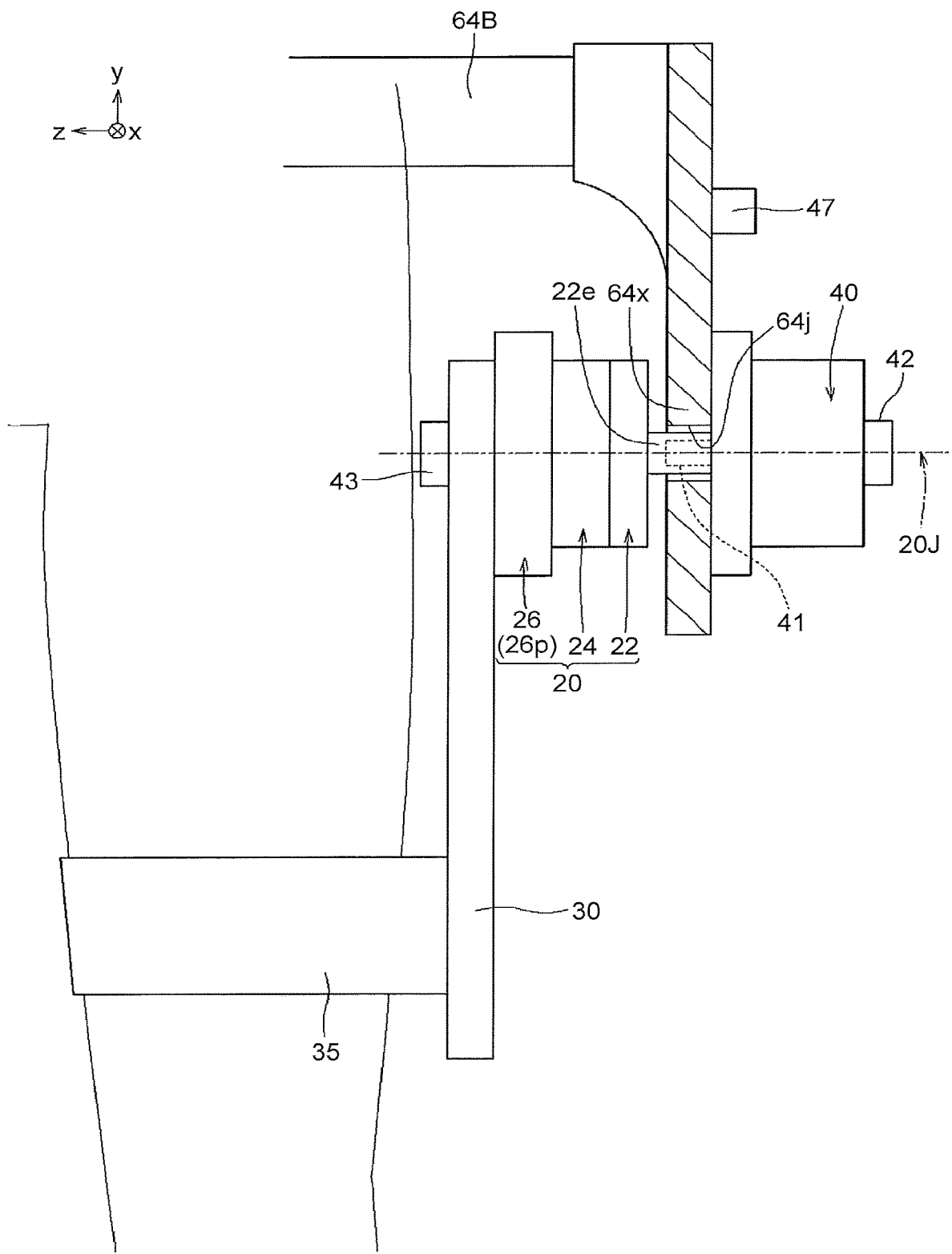
FIG. 3 is a view along the line indicated by arrows in FIG. 1 and is a diagram illustrating a configuration of an assistance mechanism in the assistance apparatus illustrated in FIG. 1.

As illustrated in FIGS. 1 and 2, the assistance apparatus 60 according to the first embodiment includes a brace 62 to be put on a part from the waist to the back of a person, and a support frame portion 64 provided under the brace 62. The support frame portion 64 includes a transverse beam 64z provided so as to extend to the right and left below the brace 62, and side plate portions 64x provided, on both right and left sides of the transverse beam 64z, substantially perpendicularly to the transverse beam 64z. Then, as illustrated in FIG. 3, in each side plate portion 64x of the support frame portion 64, a bearing hole 64j is formed at a position corresponding to the hip joints of a person, that is, a position that is substantially the same in the x direction and the y direction as the hip joints of a person. In the example illustrated in FIG. 1, the thighs of a subject person correspond to an assistance subject body part.

On the inner side of the right and left corner portions formed by the transverse beam 64z and the side plate portions 64x of the support frame portion 64, as illustrated in FIG. 3, a pair of right and left assistance mechanisms 20 (which will be described later) is provided. The assistance mechanisms 20 are provided along the z direction, and respective input shafts 22e of the assistance mechanisms 20 are inserted through the respective bearing holes 64j of the side plate portions 64x of the support frame portion 64. A rotation shaft 41 (corresponding to an output shaft) of a motor 40 (corresponding to an actuator) fixed to the outer side of each side plate portion 64x of the support frame portion 64 is coaxially joined to the input shaft 22e of each assistance mechanism 20. In other words, each assistance mechanism 20 is supported by the relevant support frame portion 64 in such a manner that the assistance mechanism 20 is pivotable about a rotation axis line 20J of the relevant input shaft 22e.

Figure 4:
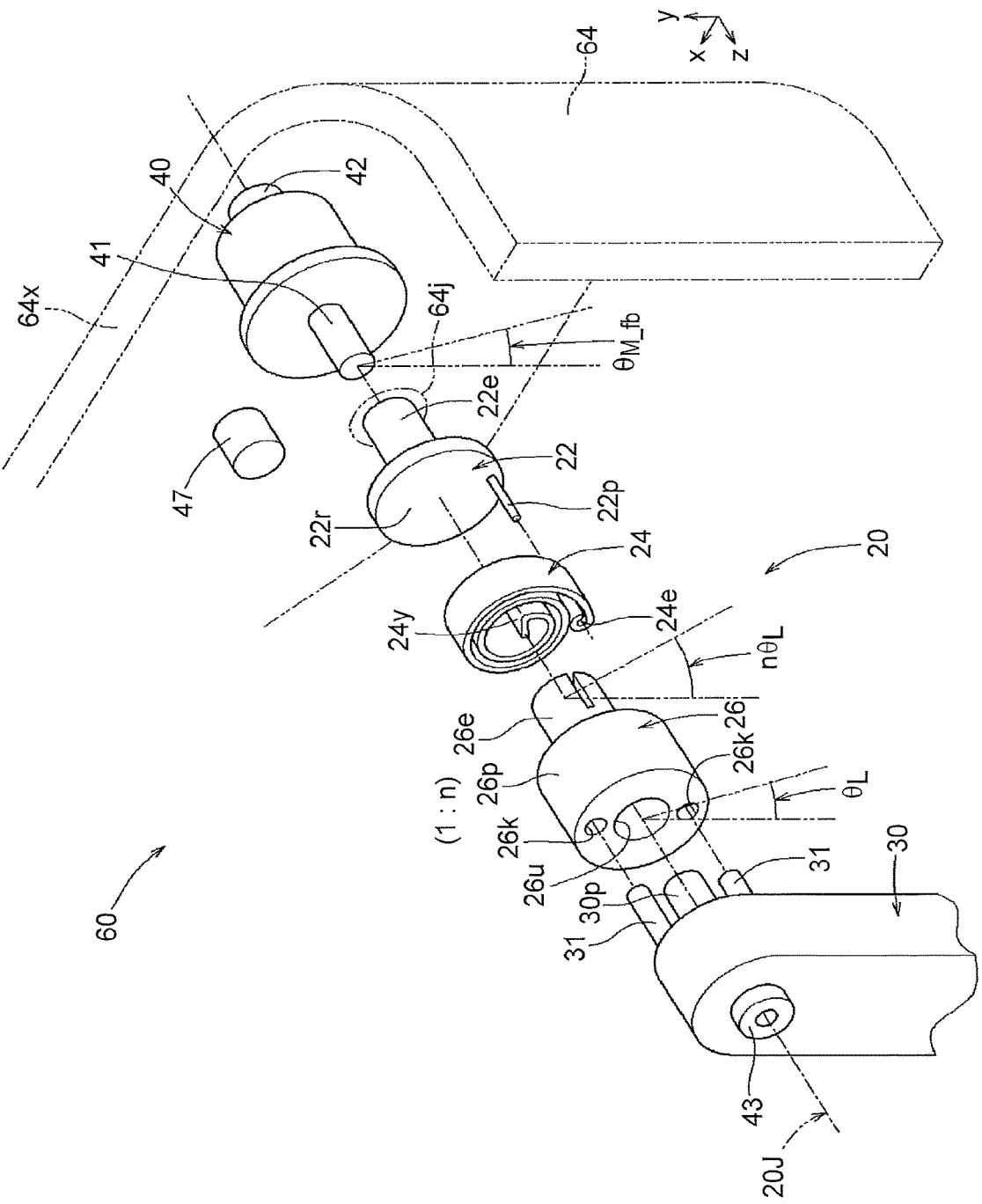
FIG. 4 is an exploded perspective view illustrating respective component members of the assistance mechanism illustrated in FIG. 3.

Also, as illustrated in FIGS. 3 and 4, a proximal end portion (pivot center portion) of a rod-like output link 30 is joined to an output rotation member 26p of each assistance mechanism 20 in such a manner that the proximal end portion is unrotatable relative to the output rotation member 26p. In other words, the pivot center portion of the output link 30 is joined at the position of the bearing hole 64j of the relevant support frame portion 64, which corresponds to a hip joint of a person, in such a manner that the pivot center portion is pivotable via the relevant assistance mechanism 20. Each output link 30 is a link disposed along an outer side surface of a thigh of a person, and is configured so that the distal end side (pivot free end side) of the output link 30 is put on a thigh of a person via a link brace 35. In other words, the aforementioned braces 62, 62y, the support frame portion 64 and the link braces 35 jointly function as a body brace in the present disclosure.

Also, on the front side of the support frame portion 64, a belt 64B for holding the support frame portion 64 at the waist of a subject person is provided. Also, the right and left parts of support frame portion 64 are slidable rightward and leftward relative to the transverse beam 64z, whereby a space in the right-left direction between the right and left parts of the support frame portion 64 can be adjusted. Also, a brace 62y is provided at an upper portion of the brace 62, and the brace 62y is slidable upward and downward relative to the brace 62. Also, on the front side of the brace 62y, belts 62B for holding the assistance apparatus 60 on the shoulders of a subject person are provided.

As illustrated in e.g., FIGS. 3 and 4, an output link pivotal angle detection section 43 that detects a pivotal angle of the output link 30 is attached to a portion of the center of pivoting of each output link 30. Also, as illustrated in, e.g., FIGS. 1 and 2, the assistance apparatus 60 includes a control box 50 to be attached to a back surface of the support frame portion 64. Also, details of the control box 50 will be described later.

A configuration of an assistance mechanism 20 will be described. As illustrated in FIGS. 3 and 4, the assistance mechanism 20 includes an input member 22, a spring 24 and a reducer 26. The spring 24 may be, e.g., a torsion spring (torsion bar or torsion bar spring) or a spiral spring. The below example of the present embodiment will be described with the spring 24 as a spiral spring 24. The input member 22 is a member that transmits rotation of the motor 40 to the spiral spring 24. The input member 22 includes an input shaft 22e to which the rotation shaft 41 of the relevant motor 40 is joined so as to be unrotatable relative to the input shaft 22e, a round plate portion 22r provided coaxially with the input shaft 22e, and a torque transmission shaft 22p provided at a peripheral edge of the round plate portion 22r on the side opposite to the input shaft 22e. Then, the torque transmission shaft 22p of the input member 22 is joined to an outer peripheral-side spring end portion 24e of the spiral spring 24. Also, assistance multiplying factor varying section 47 for varying an assistance multiplying factor is provided at a position a subject person can reach (in this case, the side plate portion 64x).

The spiral spring 24 of the assistance mechanism 20 corresponds to an elastic body, and is a member that converts an amount of rotation transmitted from the motor 40 into an assistance torque. As illustrated in FIG. 4, the spiral spring 24 includes a spring obtained by shaping a belt-like leaf spring into a spiral pattern, and includes spring end portions 24y, 24e on the center side and the outer peripheral side, respectively. The spiral spring 24 is configured in such a manner that a spring force (assistance torque) can be adjusted by changing a rotational angle of the outer peripheral-side spring end portion 24e relative to the center-side spring end portion 24y. Here, a spring constant of the spiral spring 24 is set as, for example, K. As described above, the outer peripheral-side spring end portion 24e of the spiral spring 24 is joined to the torque transmission shaft 22p of the input member 22 so as to be unrotatable relative to the torque transmission shaft 22p. Also, the center-side spring end portion 24y of the spiral spring 24 is joined to an input rotation member 26e of the reducer 26 so as to be unrotatable relative to the input rotation member 26e. Here, the input member 22 and the input rotation member 26e of the reducer 26 are held coaxially along the rotation axis line 20J. Then, the spiral spring 24 can store assistance torque from the rotation shaft 41 of the relevant motor 40 and release the stored assistance torque as a pivoting force for the output link 30.

The reducer 26 is a member that reduces an amount of rotation by assistance torque transmitted from the spiral spring 24 and transmits the reduced amount of rotation to the output link 30. As a result of the provision of the reducer 26, a spiral spring 24 having a smaller spring constant can be used, enabling reduction in size and weight of the spiral spring 24. The reducer 26 includes, e.g., the input rotation member 26e, an output rotation member 26p, and a gear mechanism (illustration thereof omitted) provided between the input rotation member 26e and the output rotation member 26p. The input rotation member 26e and the output rotation member 26p of the reducer 26 are held coaxially, and are configured so that upon n revolutions of the rotation input rotation member 26e, the output rotation member 26p revolves once (n>1).

As illustrated in FIG. 4, a positioning hole 26u that allows a rotation center pin 30p of the output link 30 to be fitted therein is formed at the center of the output rotation member 26p of the reducer 26. Furthermore, rotation-preventing holes 26k that allow rotation preventing pins 31 of the output link 30 to be inserted therein are formed around the positioning hole 26u of the output rotation member 26p. Consequently, the output link 30 can rotate integrally with the output rotation member 26p of the reducer 26.

A motor rotation angle detection section 42 functions as an output shaft rotational angle detection section, is, for example, a motor encoder, and outputs a detection signal according to a rotational angle of the rotation shaft 41 of the motor 40 to a controller 52. The controller can detect an actual motor shaft angle $\theta_{M\_fb}$ (see FIG. 6), which is a rotational angle of the rotation shaft 41 of the motor 40, based on a detection signal from the motor rotation angle detection section 42.

The output link pivotal angle detection section 43 is, for example, an encoder or a potentiometer, and outputs a detection signal according to a pivotal angle of the output link 30 to the controller 52. The controller 52 can detect an actual link angle $\theta_L$ (corresponding to an output link pivotal angle. See FIG. 6), which is a pivotal angle of the output link 30, based on a detection signal from the output link pivotal angle detection section 43. Although the description has been provided in terms of the case where each of the motor rotation angle detection section 42 and the output link pivotal angle detection section 43 is, e.g., a rotary encoder or a potentiometer, each of the motor rotation angle detection section 42 and the output link pivotal angle detection section 43 may be, e.g., a resolver (that causes alternate current to flow in a two-phase coil and detects change in phase of a voltage output from the two-phase coil), a Hall element, a photoelectric sensor (including a light projection section that emits light and a light reception section that detects received light) or a switch. Then, the spiral spring 24, the motor rotation angle detection section 42 and the output link pivotal angle detection section 43 jointly enable torque calculation (determination) and function as a torque detection section. Also, the torque detection section can be a magnetostrictive torque sensor or a torque sensor for use in electric power steering, the torque sensor measuring a torsional angle of a torsion bar via, e.g., an optical sensor or a magnetic sensor, as a torque sensor, other than the above-described one. Then, the torque detection section is provided at any position on the way from the output link 30 to the rotation shaft 41 (motor 40). The description of the present embodiment is provided using an example in which a torque detection section is formed by a motor rotation angle detection section 42, a spiral spring 24 (corresponding to an elastic body) and an output link pivotal angle detection section 43.

The controller 52 (see FIG. 5) received in the control box 50 includes a (torque) calculation section 52A that functions as a torque calculation section (for example, a CPU corresponds to the calculation section). Then, the calculation section 52A calculates a combined torque that is a combination of an assistance torque output from the rotation shaft 41 of the motor 40 and input to the spiral spring 24 via the input member 22 and a subject person torque input from a subject person to the spiral spring 24 via the output link 30 and the reducer 26 as a result of a subject person making an assistance subject body part pivot with his/her own strength. Then, as described later, the controller 52 controls the rotational angle of the rotation shaft 41 based on the combined torque.

The assistance multiplying factor varying section 47 is, for example, a magnification adjustment dial that is formed of, e.g., a variable resistance and can be operated by a subject person, and outputs a setting signal according to an adjusted position (adjusted angle) to the controller. The controller detects the adjusted position (adjusted angle) according to the setting signal and determines a value of a later-described assistance multiplying factor α (value within a range of 0<α<1) according to the adjusted position (adjusted angle).

Figure 5:
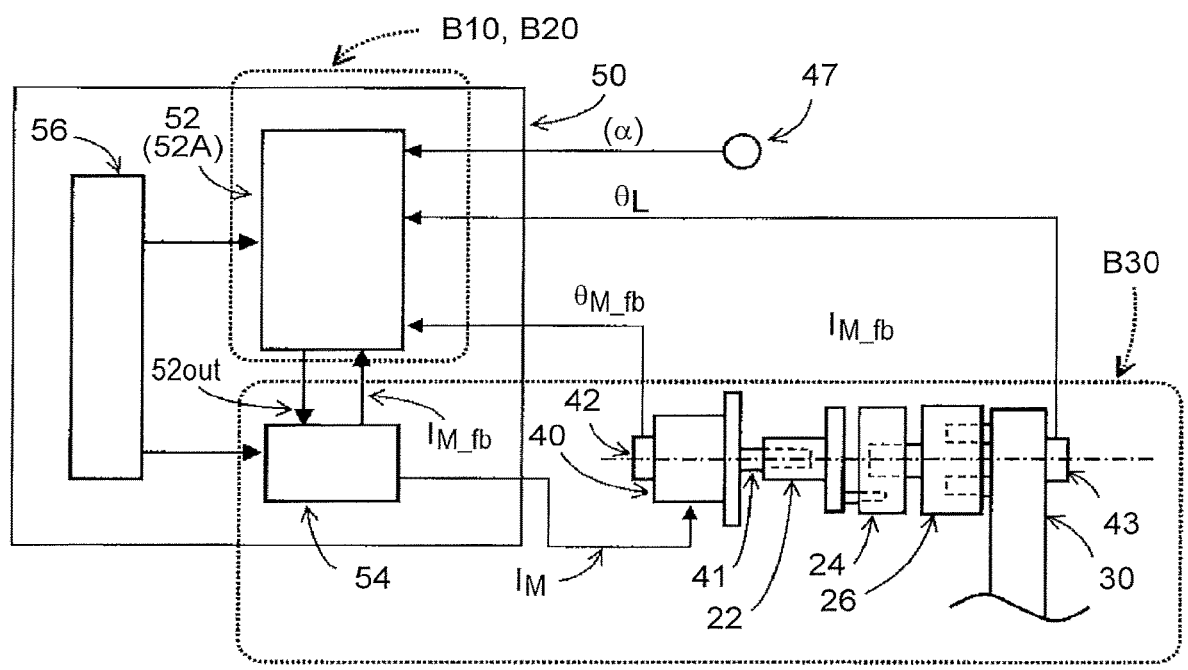
FIG. 5 is a diagram illustrating input/output to/from a controller.
Figure 6:
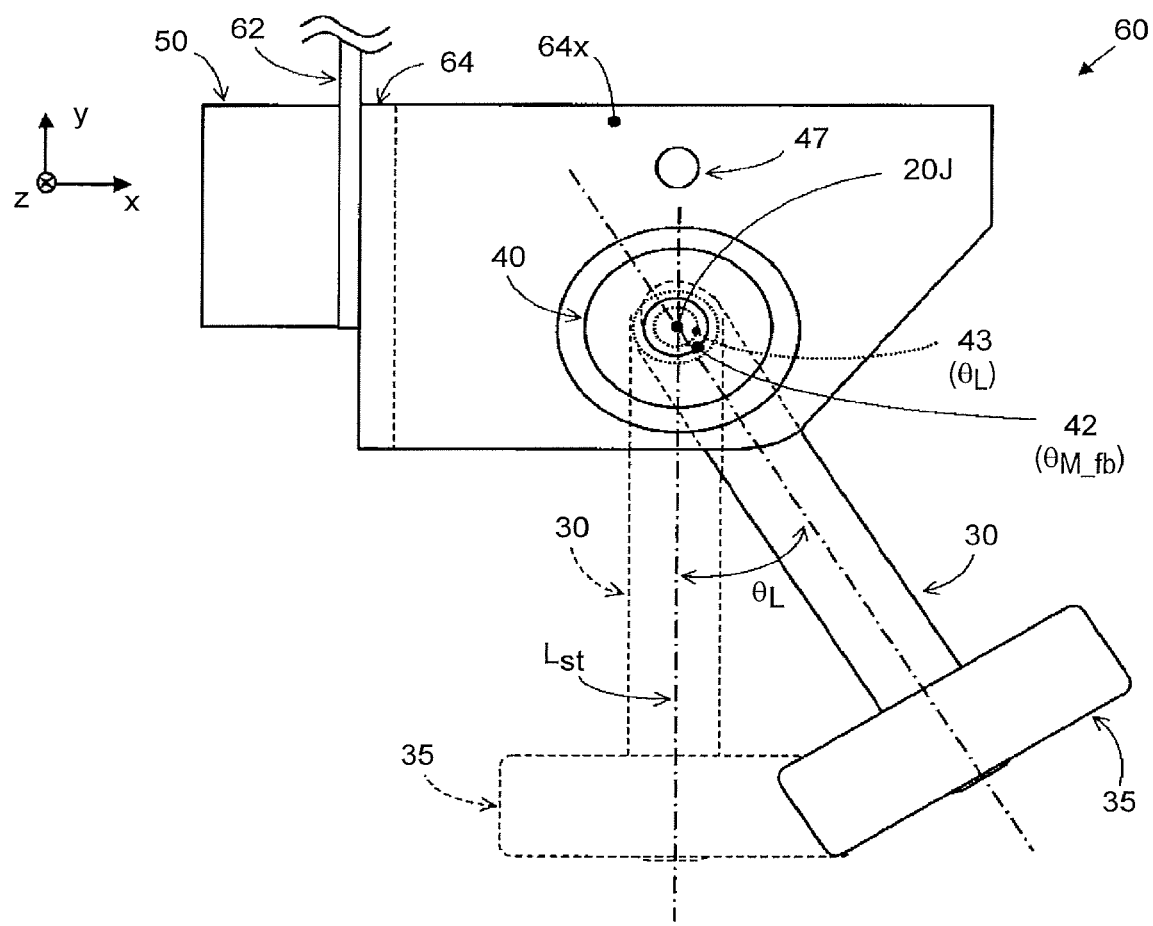
FIG. 6 is a diagram illustrating an actual motor shaft angle ($\theta_{M\_fb}$) detected by a motor encoder and an actual link angle ($\theta_L$) detected by an output link pivotal angle detection section.

A configuration of the control box 50 will be described with reference to FIG. 5. As illustrated in FIGS. 1 and 2, the control box 50 is a box attached to the back surface of the support frame portion 64. As illustrated in FIG. 5, the controller 52, a motor driver 54 and an electric power supply unit 56 are housed in the control box 50. The electric power supply unit 56 is, for example, a lithium battery, and supplies electric power to the controller 52 and the motor driver 54.

The controller 52 is supplied with electric power from the electric power supply unit 56, calculates a control signal 52 out for controlling the rotational angle of the rotation shaft 41 of the motor 40 and controls the rotational angle of the rotation shaft 41 via the motor driver 54. The controller 52 calculates an actual combined torque τ and the control signal 52 out based on the assistance multiplying factor α, the actual link angle $\theta_L$, the actual motor shaft angle $\theta_{M\_fb}$ and an actual motor current $I_{M\_fb}$. The actual motor current $I_{M\_fb}$ is converted into a signal that can be recognized by the controller 52 (e.g., a voltage value), by a current sensor (shunt resistance or magnetic sensor (that detects a magnetic flux caused by current)) provided in, e.g., the motor driver 54, and is then measured by controller 52. The assistance multiplying factor α is determined by the controller 52 based on the setting signal input from the assistance multiplying factor varying section 47 to the controller 52. The actual link angle $\theta_L$ is detected by the controller 52 based on the detection signal input from the output link pivotal angle detection section 43 to the controller 52. The actual motor shaft angle $\theta_{M\_fb}$ is detected by the controller 52 based on the detection signal input from the motor rotation angle detection section 42 to the controller 52. The actual motor current $I_{M\_fb}$ is detected by the controller 52 based on a detection signal input from the motor driver 54 to the controller 52. The actual combined torque τ is calculated by the controller 52 based on the actual link angle $\theta_L$, the actual motor shaft angle $\theta_{M\_fb}$, an expansion/contraction state of the spiral spring 24 and the spring constant of the spiral spring 24 (corresponding to a state of a spiral spring).

The motor driver 54 is a driver circuit that is supplied with electric power from the electric power supply unit 56 and converts the control signal 52 out from the controller 52 into a drive current IM for driving the motor 40. Also, the motor driver 54 outputs a value of the actual motor current $I_{M\_fb}$ corresponding to the drive current IM to the controller 52.

Figure 7:
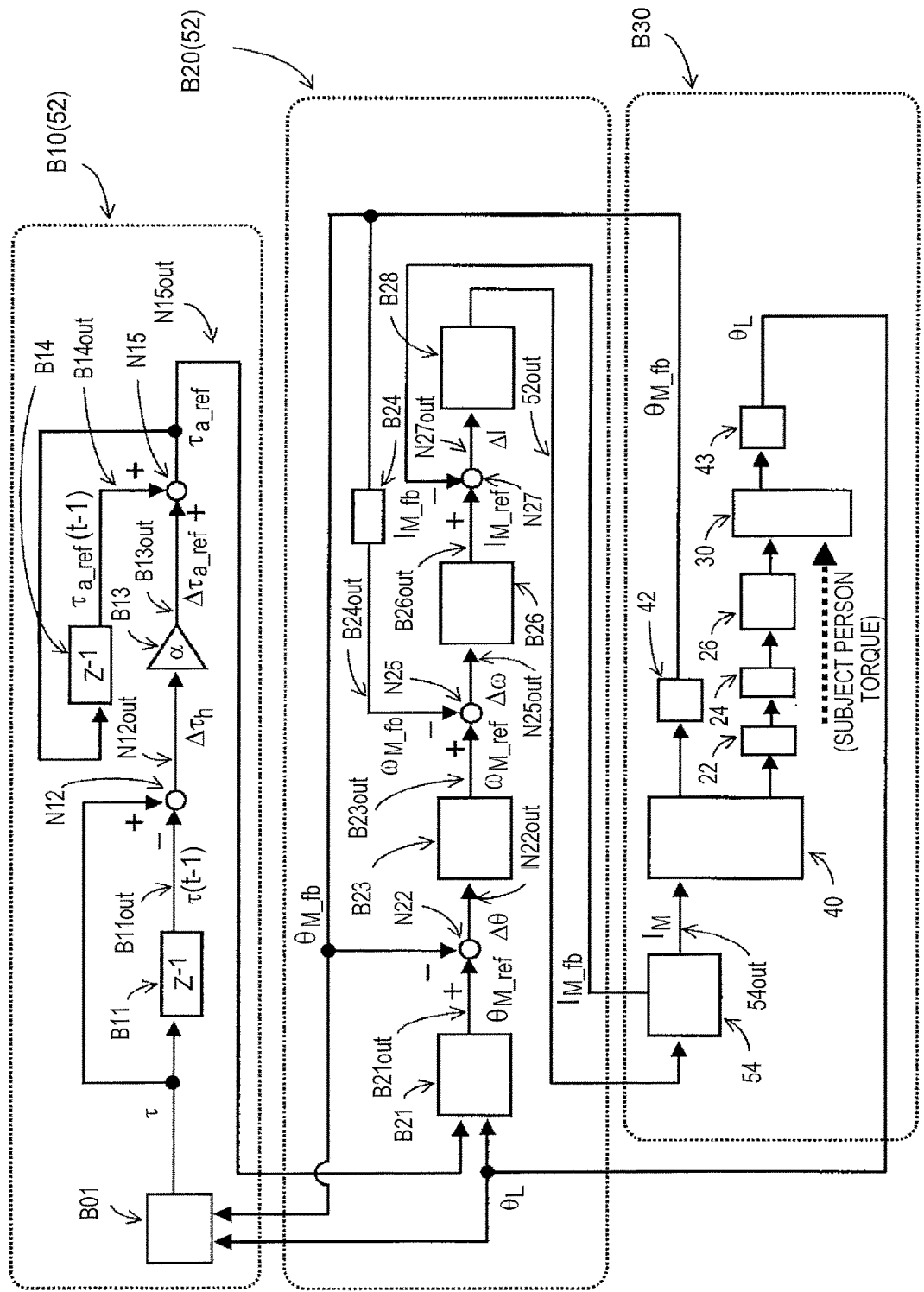
FIG. 7 is a control block diagram of the controller.
Figure 8A:
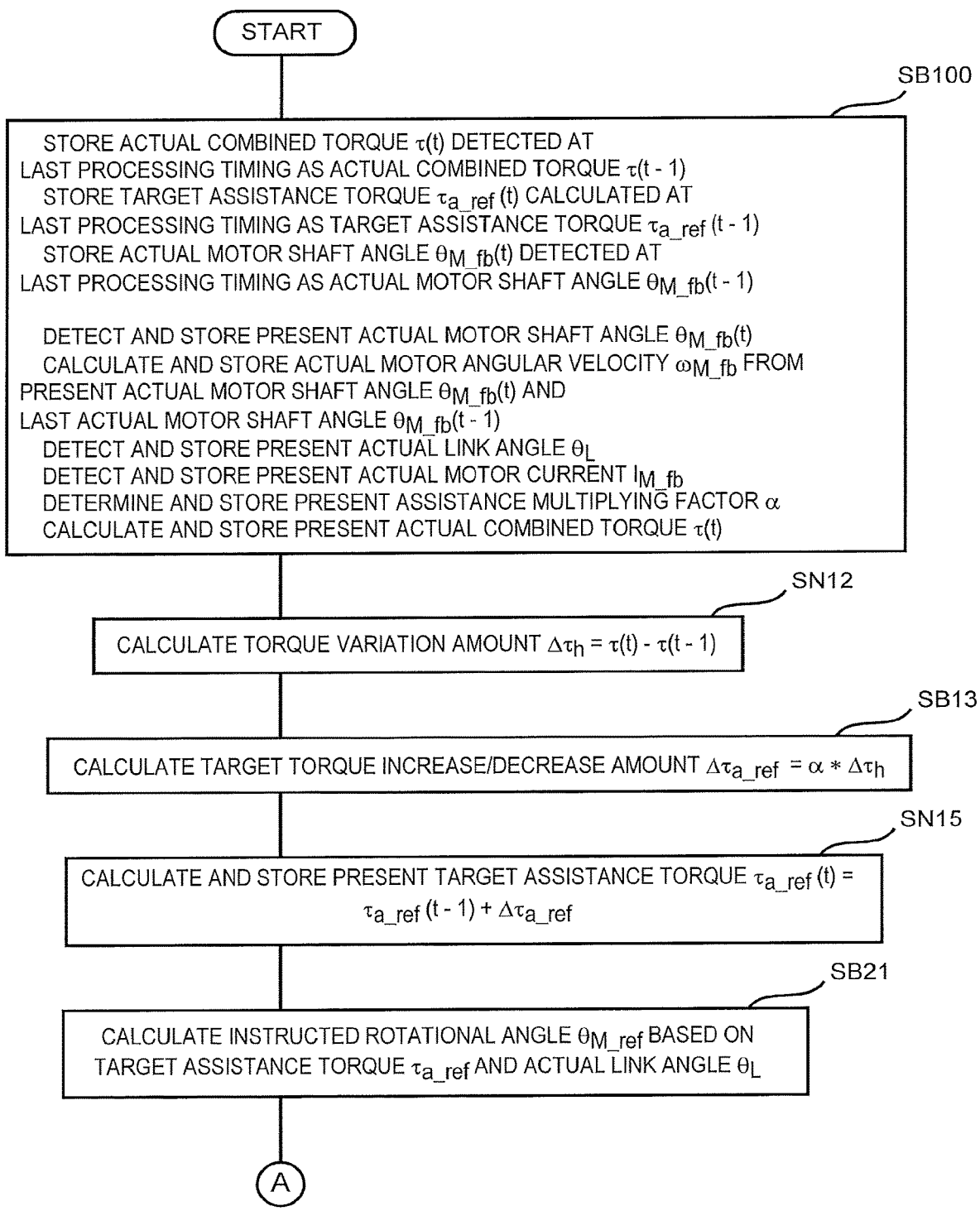
FIG. 8A is a part of flowchart illustrating a processing procedure based on the control block diagram illustrated in FIG. 7.
Figure 8B:
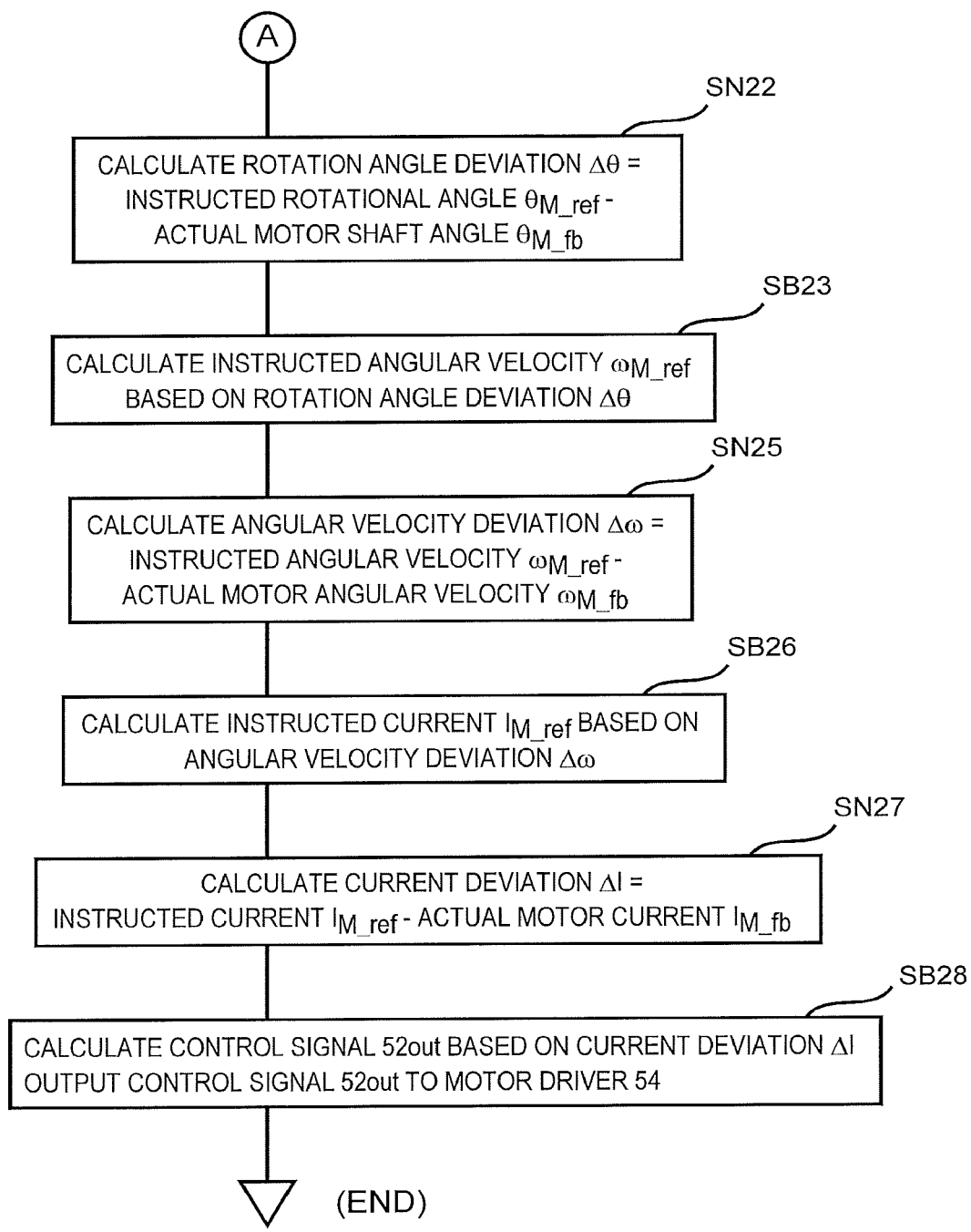
FIG. 8B is a part of flowchart illustrating a processing procedure based on the control block diagram illustrated in FIG. 7.

Next, a processing procedure in the controller 52 will be described with reference to the flowchart illustrated in FIG. 8A and FIG. 8B and the control block diagram illustrated in FIG. 7. Here, reference numeral B10 in the control block diagram illustrated in FIG. 7 is an assistance torque determination section B10 that calculates an assistance torque from the motor 40, and the controller 52 illustrated in FIG. 5 functions as the assistance torque determination section B10. Also, reference numeral B20 in the control block diagram illustrated in FIG. 7 is a motor control section B20 that determines a current for driving the motor 40, and the controller 52 illustrated in FIG. 5 functions as the motor control section B20. Also, reference numeral B30 in the control block diagram illustrated in FIG. 7 is a torque providing section B30 including the motor driver 54, the motor 40 (and the motor rotation angle detection section 42), the input member 22, the spiral spring 24, the reducer 26, the output link 30 and the output link pivotal angle detection section 43, and the part indicated by reference numeral B30 in FIG. 5 functions as the torque providing section B30.

Next, the flowchart illustrated in FIGS. 8A and 8B will be described. The processing indicated in FIGS. 8A and 8B is started at a predetermined time interval (for example, an interval of several milliseconds), and upon start of the processing, the controller 52 advances the processing to step SB100.

Step SB100 includes processing corresponding to blocks B01, B11, B14 and B24 in the control block diagram illustrated in FIG. 7 and input signal processing. In step SB100, the controller 52 stores an actual combined torque τ(t) detected and stored at a last processing timing, as a last actual combined torque τ(t−1) (processing corresponding to a block B11). Also, the controller 52 stores a target assistance torque $\tau_{a\_ref}(t)$ calculated and stored at the last processing timing, as a last target assistance torque $\tau_{a\_ref}(t-1)$ (processing corresponding to a block B14).

Also, the controller 52 stores an actual motor shaft angle $\theta_{M\_fb}(t)$ detected and stored at the last processing timing, as a last actual motor shaft angle $\theta_{M\_fb}(t-1)$. Then, the controller 52 detects and stores a present actual motor shaft angle $\theta_{M\_fb}(t)$ based on a detection signal from the motor rotation angle detection section 42. Furthermore, the controller 52 calculates and stores an actual motor angular velocity $\omega_{M\_fb}$ from the present actual motor shaft angle $\theta_{M\_fb}(t)$ and the last actual motor shaft angle $\theta_{M\_fb}(t-1)$ (processing corresponding to a block B24). Also, the controller 52 detects and stores a present actual link angle $\theta_L$ based on a detection signal from the output link pivotal angle detection section 43 (input signal processing). Also, the controller 52 calculates and stores an actual motor current $I_{M\_fb}$ based on a detection signal input from the motor driver 54. Also, the controller 52 determines and stores an assistance multiplying factor α based on a setting signal from the assistance multiplying factor varying section 47 (input signal processing). Then, the controller 52 calculates a present actual combined torque τ(t) (actual combined torque stored in the spiral spring 24) by means of calculation according to (Expression 1) below, using the present actual link angle $\theta_L(t)$, a reduction ratio (1/n) of the reducer 26, the present actual motor shaft angle $\theta_{M\_fb}(t)$ and a state of the spiral spring 24 (spring constant K) (processing corresponding to a block B01).

$$\tau(t)=K[\theta_{M\_fb}(t)-n*\theta_L(t)] \quad \text{(Expression 1)}$$

Step SN12 corresponds to processing in a node N12 in the control block diagram illustrated in FIG. 7. In step SN12, the controller 52 calculates a difference between the present actual combined torque $\tau(t)$ and the last actual combined torque $\tau(t-1)$ input from the block B11 and outputs a calculated torque variation amount $\Delta\tau_h$ to a block B13, and proceeds to step SB13. Also, the torque variation amount $\Delta\tau_h$ corresponds to a subject person torque-related amount related to a subject person torque, the subject person torque-related amount being extracted from a combined torque $\tau$, and is calculated according to (Expression 2) below. Here, an assistance torque output at a last calculation timing can be regarded as constant until output of a new assistance torque at a present calculation timing. Therefore, a variation amount (deviation) between the actual combined torque $\tau(t)$ at the present calculation timing and the actual combined torque $\tau(t-1)$ at the last calculation timing can be regarded as a variation amount (deviation) of a subject person torque input from a subject person. In other words, calculation of a difference between the present actual combined torque $\tau(t)$ that is a combination of a present subject person torque and an assistance torque and the last actual combined torque $\tau(t-1)$ enables calculation of a variation amount of the subject person torque with an effect of the assistance torque excluded. Here, when a torque variation amount $\Delta\tau_h$ is calculated, it is important to use not $\theta_{M\_fb}(t)$ but $\theta_{M\_fb}(t-1)$ for $K[\theta_{M\_fb}(t-1)-n*\theta_L(t)]$ corresponding to $\tau(t)$. As of step SN12, the actual motor shaft angle is not yet updated (will be updated in step SB28 that is the last of the processing in FIGS. 8A and 8B), and thus, $\theta_{M\_fb}(t-1)$ is used. Also, the controller 52 varies an instructed current $I_{M\_ref}$ for the motor 40 based on the variation of the subject person torque. The instructed current $T_{M\_ref}$ is calculated by the controller 52 at a calculation timing that causes no feeling of discomfort in motion of the subject person (for example, a calculation timing that comes at a calculation interval of no more than 100 [ms], the calculation interval being preferably a shorter time interval for smoother motion). In other words, the controller 52 drives the motor 40 based on the variation of the subject person torque, and after the driving of the motor 40 based on the variation of the subject person torque, a variation of the subject person torque (movement of the subject person) is awaited, and thus, the assistance torque from the motor 40 becomes substantially constant. Also, a torque of, e.g., a motor can be calculated from at least either of a rotation speed of the motor and a drive current for the motor according to, e.g., a T-N characteristic (characteristic indicating a relationship between a torque [N·m] and a rotation speed [rpm]) particular to the motor and a T-I characteristic (characteristic indicating a relationship between the torque [N·m] and a current [A]). Then, the subject person torque can be calculated with higher accuracy from the actual combined torque $\tau$ in consideration of the variation of the torque of the motor 40 (assistance torque). In this case, at least either of a rotation speed detection section that detects the rotation speed of the motor (for example, a rotation sensor) and a current detection sensor that detects the drive current for the motor for example, the aforementioned current sensor (shunt resistance or magnetic sensor) may be provided. Then, the controller 52 (torque calculation section (52A)) detects an assistance torque based on at least either of the rotation speed of the motor and the drive current for the motor and calculates a subject person torque based on the combined torque and the assistance torque.

$$\begin{aligned}\Delta\tau_h &= \tau(t) - \tau(t-1) \\ &= K[\theta_{M\_fb}(t-1) - n*\theta_L(t)] - \\ &\quad K[\theta_{M\_fb}(t-1) - n*\theta_L(t-1)] \\ &= n*K[\theta_L(t-1) - \theta_L(t)]\end{aligned} \quad \text{(Expression 2)}$$

Step SB13 corresponds to processing in the block B13 in the control block diagram illustrated in FIG. 7. In step SB13, the controller 52 calculates an assistance increase/decrease amount $\Delta\tau_{a\_ref}$ by multiplying the torque variation amount $\Delta\tau_h$ input from the node N12 by the determined assistance multiplying factor $\alpha$ and outputs the calculated assistance increase/decrease amount to a node N15, and proceeds to step SN15. Here, the assistance multiplying factor $\alpha$ is a value in a range of $0<\alpha<1$. Also, the assistance increase/decrease amount $\Delta\tau_{a\_ref}$ is calculated according to (Expression 3) below.

$$\Delta\tau_{a\_ref}=\alpha*\Delta\tau_h \quad \text{(Expression 3)}$$

Step SN15 corresponds to processing in the node N15 in the control block diagram illustrated in FIG. 7. In step SN15, the controller 52 calculates the sum of the assistance increase/decrease amount $\Delta\tau_{a\_ref}$ input from the block B13 and the last target assistance torque $\tau_{a\_ref}(t-1)$ input from the block B14 and outputs the calculated target assistance torque $\tau_{a\_ref}$ to a block B21, and proceeds to step SB21. The target assistance torque $\tau_{a\_ref}(\tau_{a\_ref}(t))$ can be calculated according to (Expression 4) below. In other words, a present target assistance torque $\tau_{a\_ref}$ can be calculated based on a torque that is the subject person torque-related amount ($\Delta\tau_h$) multiplied by a predetermined multiplying factor (assistance multiplying factor ($\alpha$)), and the last target assistance torque $\tau_{a\_ref}(t-1)$.

$$\tau_{a\_ref}(t)=\tau_{a\_ref}(t-1)+\alpha*\Delta\tau_h \quad \text{(Expression 4)}$$

Step SB21 corresponds to processing in the block B21 in the control block diagram illustrated in FIG. 7. In step SB21, the controller 52 calculates an instructed rotational angle $\theta_{M\_ref}$ for the rotation shaft 41 of the motor 40 based on the actual link angle $\theta_L$ and the target assistance torque $\tau_{a\_ref}$ input from the node N15. Then, the controller 52 outputs the calculated instructed rotational angle $\theta_{M\_ref}$ to a node N22 and proceeds to step SN22. Here, according to the below definitions, the target assistance torque $\tau_{a\_ref}$ can be expressed by (Expression 5) below. Then, as a result of reorganization of (Expression 5), the instructed rotational angle $\theta_{M\_ref}$ can be expressed by (Expression 6). This instructed rotational angle $\theta_{M\_ref}$ corresponds to an output shaft rotational angle.

$\theta_{M\_ref}$: instructed rotational angle
$\tau_{a\_ref}$: target assistance torque
K: spring constant of spiral spring 24
$\theta_L$: actual link angle
n: value corresponding to a reduction ratio at which when the input rotation member 26e of the reducer 26 makes n revolutions, the output rotation member 26p revolves once (n>1)

$$\tau_{a\_ref}=K[\theta_L-(\theta_{M\_ref}/n)] \quad \text{(Expression 5)}$$

$$\theta_{M\_ref}=[(K*\theta_L-\tau_{a\_ref})*n/K] \quad \text{(Expression 6)}$$

Step SN22 corresponds to processing in the node N22 in the control block diagram illustrated in FIG. 7. In step SN22, the controller 52 calculates a rotation angle deviation Δθ that is a difference between the instructed rotational angle $θ_{M\_ref}$ input from the block B21 and the actual motor shaft angle $θ_{M\_fb}$. Then, the controller 52 outputs the calculated rotation angle deviation Δθ to a block B23 and proceeds to step SB23. Here, the rotation angle deviation Δθ is calculated according to (Expression 7) below.

$$Δθ = θ_{M\_ref} - θ_{M\_fb} \quad \text{(Expression 7)}$$

Step SB23 corresponds to processing in the block B23 in the control block diagram illustrated in FIG. 7. In step SB23, the controller 52 calculates an instructed angular velocity $ω_{M\_ref}$ based on the rotation angle deviation Δθ input from the node N22, using, e.g., existing PID control. Then, the controller 52 outputs the calculated instructed angular velocity $ω_{M\_ref}$ to a node N25 and proceeds to step SN25. Here, a procedure and method for calculating the instructed angular velocity $ω_{M\_ref}$ from the rotation angle deviation Δθ are not specifically limited, and any procedure and method may be used for calculating the instructed angular velocity $ω_{M\_ref}$.

Step SN25 corresponds to processing in the node N25 in the control block diagram illustrated in FIG. 7. In step SN25, the controller 52 calculates an angular velocity deviation Δω that is a difference between the instructed angular velocity $ω_{M\_ref}$ input from the block B23 and the actual motor angular velocity $ω_{M\_fb}$ input from the block B24. Then, the controller 52 outputs the calculated angular velocity deviation Δω to a block B26 and proceeds to step SB26. Here, the angular velocity deviation Δω is calculated according to (Expression 8) below.

$$Δω = ω_{M\_ref} - ω_{M\_fb} \quad \text{(Expression 8)}$$

Step SB26 corresponds to processing in the block B26 in the control block diagram illustrated in FIG. 7. In step SB26, the controller 52 calculates an instructed current $I_{M\_ref}$ based on the angular velocity deviation Δω input from the node N25, using, e.g., existing PID control. Then, the controller 52 outputs the calculated instructed current $I_{M\_ref}$ to a node N27 and proceeds to step SN27. Here, a procedure and method for calculating the instructed current $I_{M\_ref}$ from the angular velocity deviation Δω are not specifically limited, and any procedure and method may be used to calculate the instructed current $I_{M\_ref}$.

Step SN27 corresponds to processing in the node N27 in the control block diagram illustrated in FIG. 7. In step SN27, the controller 52 calculates a current deviation ΔI that is a difference between the instructed current $I_{M\_ref}$ input from the block B26 and the actual motor current $I_{M\_fb}$. Then, the controller 52 outputs the calculated current deviation ΔI to a block B28 and proceeds to step SB28. Here, the current deviation ΔI is calculated according to (Expression 9) below.

$$ΔI = I_{M\_ref} - I_{M\_fb} \quad \text{(Expression 9)}$$

Step SB28 corresponds to processing in the block B28 in the control block diagram illustrated in FIG. 7. In step SB28, the controller 52 calculates a control signal 52 out based on the current deviation ΔI input from the node N27, using, e.g., existing PID control. For example, the control signal 52 out is a control signal according to the motor driver 54 such as a PWM signal set so as to have a duty corresponding to the current deviation ΔI. Then, the controller 52 outputs the calculated control signal 52 out to the motor driver 54 and ends the processing. Here, a procedure and method for calculating the control signal 52 out from the current deviation ΔI are not specifically limited, and any procedure and method may be used to calculate the control signal 52 out.

Next, an assistance apparatus 10 according to a second embodiment will be described below with reference to FIGS. 9 to 16. The assistance apparatus 10 according to the second embodiment is an apparatus that when a person lifts a parcel W up, assists upward pivoting of the upper arms. Here, the x direction, the y direction and the z direction indicated in the figures are orthogonal to one another, and correspond to a forward direction, an upward direction and a leftward direction of a person wearing an assistance apparatus 10, respectively.

Figure 9:
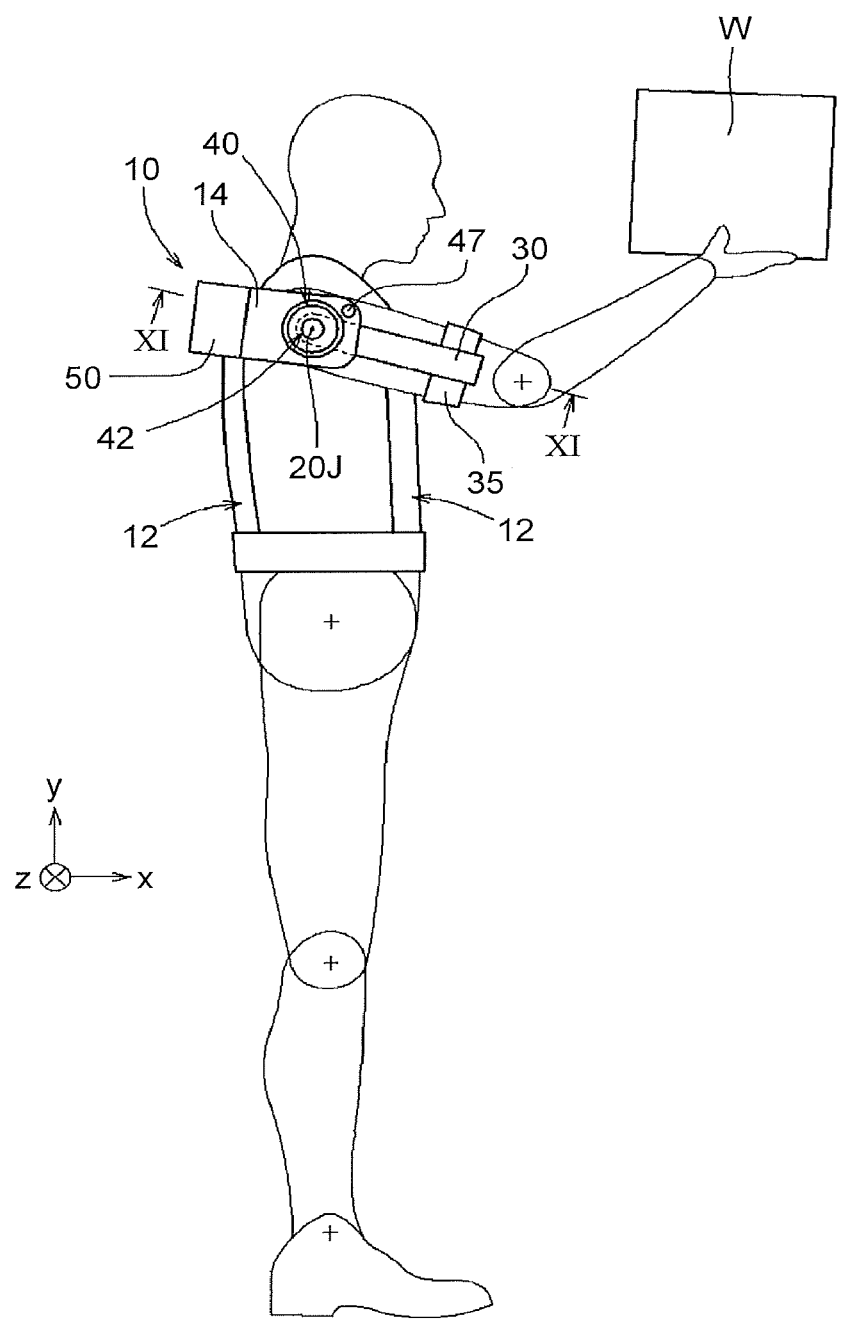
FIG. 9 is a schematic side view illustrating a state of use of an assistance apparatus according to a second embodiment.
Figure 10:
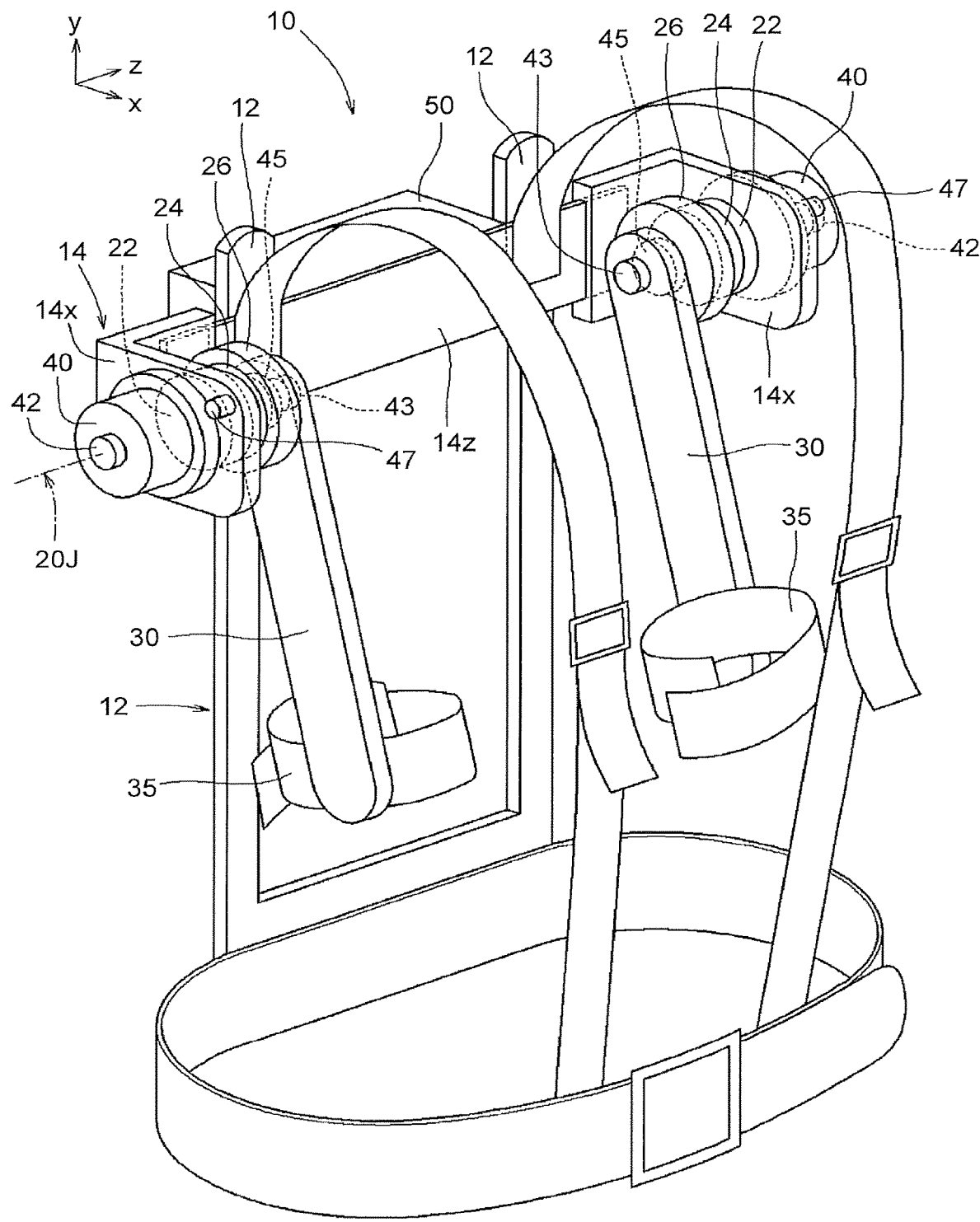
FIG. 10 is a perspective view illustrating an outer appearance of the assistance apparatus illustrated in FIG. 9.
Figure 11:
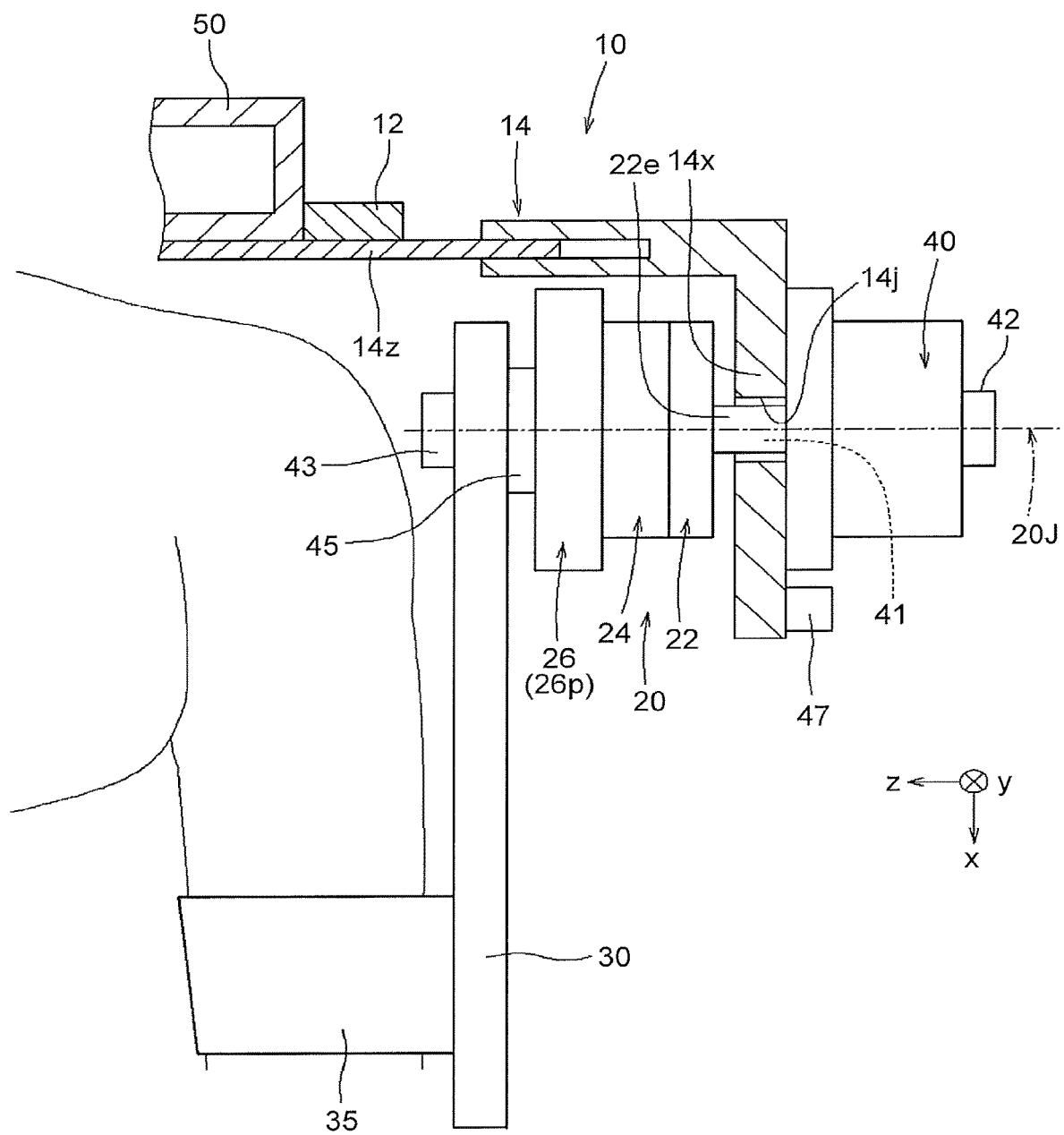
FIG. 11 is a view along the line indicated by arrows XI-XI in FIG. 9 and is a diagram illustrating a configuration of an assistance mechanism in the assistance apparatus illustrated in FIG. 9.

A configuration of the assistance apparatus 10 will be described with reference to FIGS. 9 to 12. As illustrated in FIGS. 9 and 10, the assistance apparatus 10 according to the second embodiment includes an upper body brace 12 to be put on the upper body of a person, and a support frame portion 14 provided at an upper part of a back surface of the upper body brace 12. The support frame portion 14 includes a transverse beam 14z provided so as to extend to the right and left at the upper part of the back surface of the upper body brace 12, and side plate portions 14x provided, on both right and left sides of the transverse beam 14z, substantially perpendicularly to the transverse beam 14z. Then, as illustrated in FIG. 11, in each side plate portion 14x of the support frame portion 14, a bearing hole 14j is formed at a position corresponding to the shoulder joints of a person, that is, a position that is substantially the same in the x and y directions as the shoulder joints of a person. In the example illustrated in FIG. 9, the upper arms of a subject person correspond to an assistance subject body part.

On the inner side of the right and left corner portions formed by the transverse beam 14z and the side plate portions 14x of the support frame portion 14, as illustrated in FIG. 11, a pair of right and left assistance mechanisms 20 (which will be described later) is provided. The assistance mechanisms 20 are provided along the z direction, and respective input shafts 22e of the assistance mechanisms 20 are inserted through the respective bearing holes 14j of the side plate portions 14x of the support frame portion 14. A rotation shaft 41 (corresponding to an output shaft) of a motor 40 (functioning as an actuator) fixed to the outer side of each side plate portion 14x of the support frame portion 14 is coaxially joined to the input shaft 22e of each assistance mechanism 20. In other words, each assistance mechanism 20 is supported by the relevant support frame portion 14 in such a manner that the assistance mechanism 20 is pivotable about a rotation axis line 20J of the relevant input shaft 22e.

Figure 12:
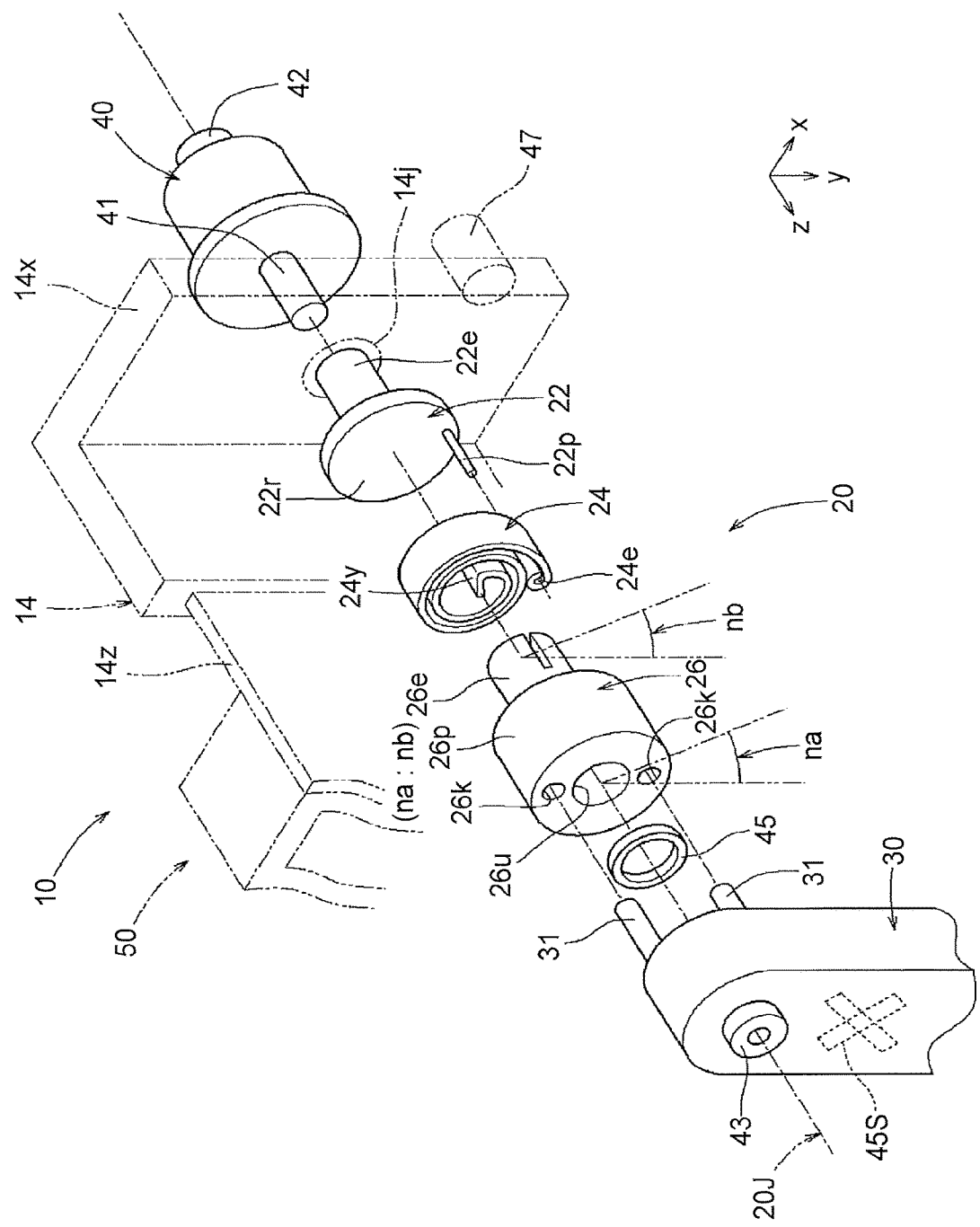
FIG. 12 is an exploded perspective view illustrating respective component members of the assistance mechanism illustrated in FIG. 11.

Also, as illustrated in FIGS. 11 and 12, a proximal end portion (pivot center portion) of a rod-like output link 30 is joined to an output rotation member 26p of each assistance mechanism 20 in such a manner that the proximal end portion is unrotatable relative to the output rotation member 26p. In other words, the pivot center portion of the output link 30 is joined at the position of the bearing hole 14j of the relevant support frame portion 14, which corresponds to a shoulder joint of a person, in such a manner that the pivot center portion is pivotable upward/downward via the relevant assistance mechanism 20. Each output link 30 is a link disposed along an outer side surface of an upper arm of a person, and is configured so that the distal end side (pivot free end side) of the output link 30 is put on an upper arm of a person via a link brace 35. In other words, the aforementioned upper body brace 12 and the support frame portion 14 jointly correspond to a body brace in the present disclosure.

As illustrated in e.g., FIGS. 11 and 12, an output link pivotal angle detection section 43 that detects a pivotal angle of the output link 30 is attached to a portion of the center of pivoting of each output link 30. Also, as illustrated in, e.g., FIGS. 9 and 10, the assistance apparatus 10 includes a control box 50 to be attached to a back surface of the support frame portion 14.

[Configuration of Assistance Mechanism 20 (FIGS. 11 and 12)]

As illustrated in FIGS. 11 and 12, the assistance mechanism 20 includes an input member 22, a spiral spring 24 and a reducer 26. The input member 22 is a member that transmits rotation of the motor 40 to the spiral spring 24. The input member 22 includes an input shaft 22e to which the rotation shaft 41 of the relevant motor 40 is joined so as to be unrotatable relative to the input shaft 22e, a round plate portion 22r provided coaxially with the input shaft 22e, and a torque transmission shaft 22p provided at a peripheral edge of the round plate portion 22r on the side opposite to the input shaft 22e. Then, the torque transmission shaft 22p of the input member 22 is joined to an outer peripheral-side spring end portion 24e of the spiral spring 24. Also, assistance multiplying factor varying section 47 for varying an assistance multiplying factor is provided at a position a subject person can reach (in this case, the side plate portion 14x).

The spiral spring 24 of the assistance mechanism 20 is a member that converts an amount of rotation transmitted from the motor 40 into an assistance torque. As illustrated in FIG. 12, the spiral spring 24 includes a spring obtained by shaping a belt-like leaf spring into a spiral pattern, and includes spring end portions 24y, 24e on the center side and the outer peripheral side, respectively. The spiral spring 24 is configured in such a manner that a spring force (assistance torque) can be adjusted by changing a rotational angle of the outer peripheral-side spring end portion 24e relative to the center-side spring end portion 24y. Here, a spring constant of the spiral spring 24 is set as, for example, K. As described above, the outer peripheral-side spring end portion 24e of the spiral spring 24 is joined to the torque transmission shaft 22p of the input member 22 so as to be unrotatable relative to the torque transmission shaft 22p. Also, the center-side spring end portion 24y of the spiral spring 24 is joined to an input rotation member 26e of the reducer 26 so as to be unrotatable relative to the input rotation member 26e. Here, the input member 22 and the input rotation member 26e of the reducer 26 are held coaxially along the rotation axis line 20J. The spiral spring 24 corresponds to an elastic body in the present disclosure. Then, the spiral spring 24 can store assistance torque from the rotation shaft 41 of the relevant motor 40 and release the stored assistance torque as a pivoting force for the output link 30.

The reducer 26 is a member that reduces an amount of rotation by assistance torque transmitted from the spiral spring 24 and transmits the reduced amount of rotation to the output link 30. As a result of the provision of the reducer 26, a spiral spring 24 having a smaller spring constant can be used, enabling reduction in size and weight of the spiral spring 24. The reducer 26 includes, e.g., the input rotation member 26e, an output rotation member 26p, and a gear mechanism (illustration thereof omitted) provided between the input rotation member 26e and the output rotation member 26p. The input rotation member 26e and the output rotation member 26p of the reducer 26 are held coaxially, and are configured so that upon nb revolutions of the rotation input rotation member 26e, the output rotation member 26p makes na revolutions (na<nb).

As illustrated in FIG. 12, a positioning hole 26u that allows a rotation center pin (not illustrated) of the output link 30 to be fitted therein is formed at the center of the output rotation member 26p of the reducer 26. Furthermore, rotation-preventing holes 26k that allow rotation preventing pins 31 of the output link 30 to be inserted therein are formed around the positioning hole 26u of the output rotation member 26p. Consequently, the output link 30 can rotate integrally with the output rotation member 26p of the reducer 26.

A motor rotation angle detection section 42 is, for example, a motor encoder, and outputs a detection signal according to a rotational angle of the rotation shaft 41 of the motor 40 to a controller. The controller can detect an actual motor shaft angle $\theta_{M\,fb}$ (see FIG. 14), which is a rotational angle of the rotation shaft 41 of the motor 40, based on a detection signal from the motor rotation angle detection section 42.

The output link pivotal angle detection section 43 is, for example, an encoder or a potentiometer, and outputs a detection signal according to a pivotal angle of the output link 30 to the controller. The controller can detect an actual link angle $\theta_L$ (see FIG. 14), which is a pivotal angle of the output link 30, based on a detection signal from the output link pivotal angle detection section 43.

A torque detection section 45 is, for example, a rotation torque meter-type torque sensor having a ring-like shape, is provided between the output rotation member 26p of the reducer 26 and the output link 30, detects a torque between the output rotation member 26p and the output link 30 and outputs a detection signal to the controller. Here, the torque detected by the torque detection section 45 is a combined torque that is a combination of an assistance torque input from the rotation shaft 41 of the motor 40 via the input member 22, the spiral spring 24 and the reducer 26 and a subject person torque input from a subject person via the output link 30 as a result of the subject person making the assistance subject body part pivot with the subject person's own strength.

Here, instead of the aforementioned rotation torque meter-type torque sensor, a strain gauge (two cross gauge)-type torque sensor may be used. Where a strain gauge-type torque sensor is used, instead of the torque detection section 45 indicated by solid lines in FIG. 12, a torque detection section 45S, which is indicated by the dotted lines in FIG. 12, is used. In other words, where a strain gauge-type torque sensor is used, a position of attachment of the torque detection section is changed. The output link 30 has an elongated shape, and a pivoting support portion on one end side thereof (pivoting support portion supported by the reducer 26) is supported so as to pivot about the relevant joint in the assistance subject body part. Also, a body fixing portion on the other end side of the output link 30 (part to which the link brace 35 is fixed) is fixed to the assistance subject body part. Then, the strain gauge-type torque detection section 45S is provided between the pivoting support portion and the body fixing portion of the output link 30 (more preferably, near the pivoting support portion) and detects a torque based on strain around the pivoting support portion (combined torque that is a combination of a subject person torque and an assistance torque). Here, the description of the present embodiment is provided in terms of an example in which the rotation torque meter-type torque detection section 45 is used.

The assistance multiplying factor varying section 47 is a magnification adjustment dial that is formed of, e.g., a variable resistance and can be operated by a subject person, and outputs a setting signal according to an adjusted position (adjusted angle) to the controller. The controller detects the adjusted position (adjusted angle) according to the setting signal and determines a value of a later-described assistance multiplying factor α (value within a range of 0<α<1) according to the adjusted position (adjusted angle).

[Configuration of Control Box 50 (FIG. 13)]

Figure 13:
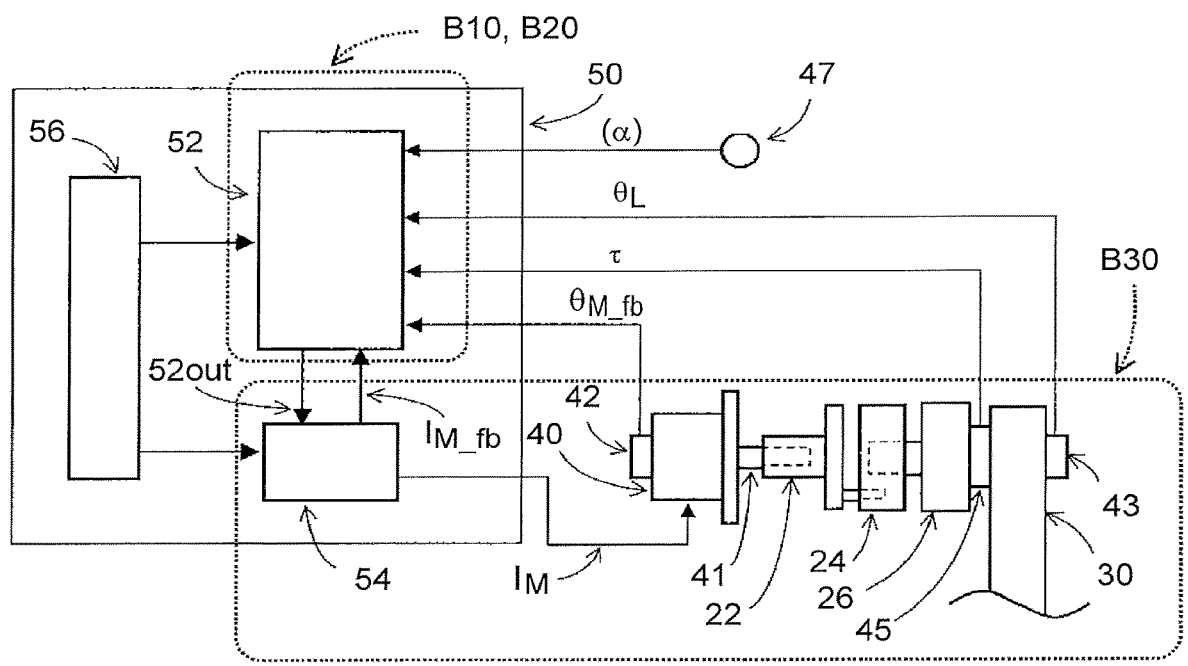
FIG. 13 is a diagram illustrating input/output to/from a controller.
Figure 14:
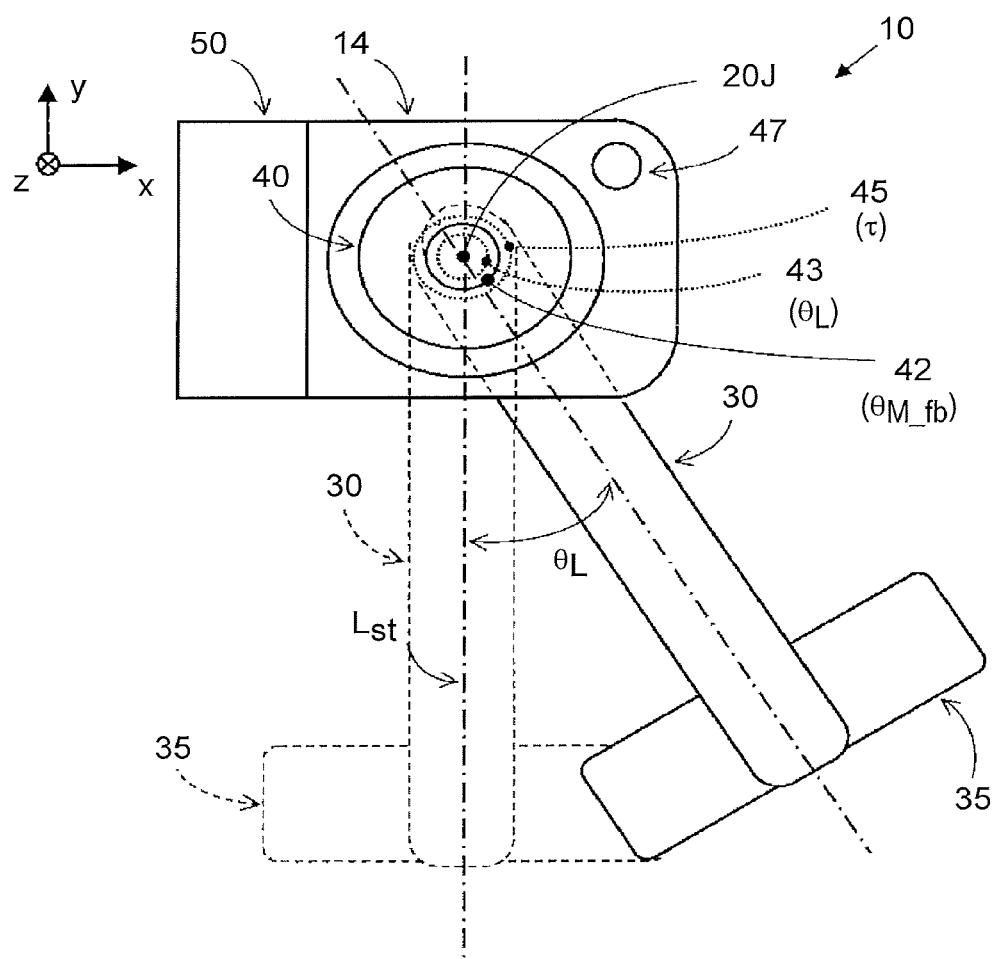
FIG. 14 is a diagram illustrating an actual combined torque ($\tau$) detected by a torque detection section, an actual motor shaft angle ($\theta_{M\_fb}$) detected by a motor encoder and an actual link angle ($\theta_L$) detected by a pivotal angle detection section.

As illustrated in FIGS. 9 and 10, the control box 50 is a box attached to the back surface of the upper body brace 12. As illustrated in FIG. 13, the controller 52, a motor driver 54 and an electric power supply unit 56 are housed in the control box 50. The electric power supply unit 56 is, for example, a lithium battery, and supplies electric power to the controller 52 and the motor driver 54.

The controller 52 is supplied with electric power from the electric power supply unit 56, calculates a control signal 52 out for controlling the rotational angle of the rotation shaft 41 of the motor 40 and controls the rotational angle of the rotation shaft 41 via the motor driver 54. The controller 52 calculates the control signal 52 out based on the assistance multiplying factor α, the actual link angle $θ_L$, an actual combined torque τ, the actual motor shaft angle $θ_{M\_fb}$ and an actual motor current $I_{M\_fb}$. The assistance multiplying factor α is determined by the controller 52 based on the setting signal input from the assistance multiplying factor varying section 47 to the controller 52. The actual link angle $θ_L$ is detected by the controller 52 based on the detection signal input from the output link pivotal angle detection section 43 to the controller 52. The actual combined torque τ is detected by the controller 52 based on the detection signal input from the torque detection section 45 to the controller 52. The actual motor shaft angle $θ_{M\_fb}$ detected by the controller 52 based on the detection signal input from the motor rotation angle detection section 42 to the controller 52. The actual motor current $I_{M\_fb}$ is detected by the controller 52 based on a detection signal input from the motor driver 54 to the controller 52.

The motor driver 54 is a driver circuit that is supplied with electric power from the electric power supply unit 56 and converts the control signal 52 out from the controller 52 into a drive current IM for driving the motor 40. Also, the motor driver 54 outputs a value of the actual motor current $I_{M\_fb}$ corresponding to the drive current IM to the controller 52.

[Control Blocks (FIG. 15) and Processing Procedure in Controller 52 (FIG. 16A and FIG. 16B)]

Figure 15:
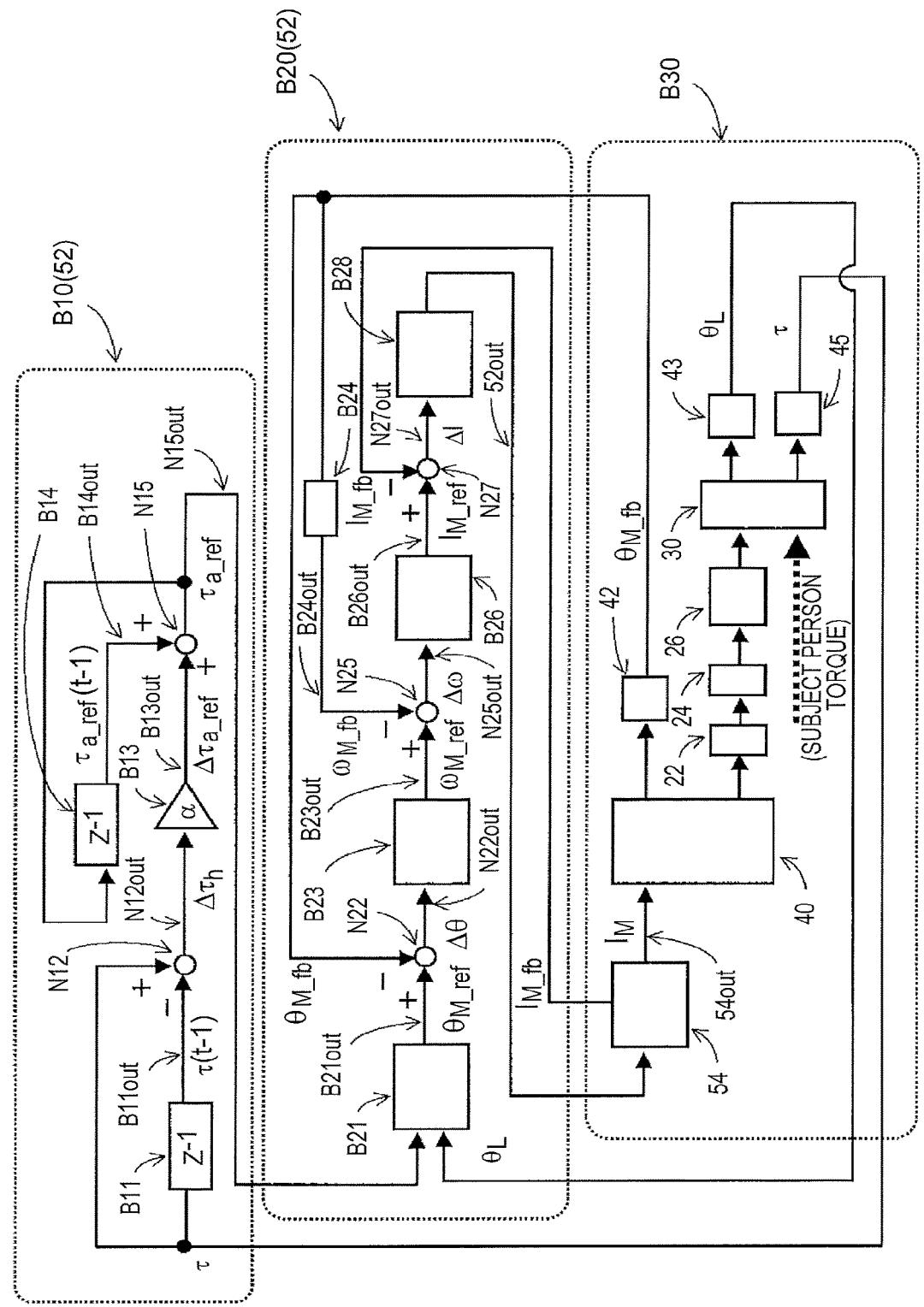
FIG. 15 is a control block diagram of the controller.
Figure 16A:
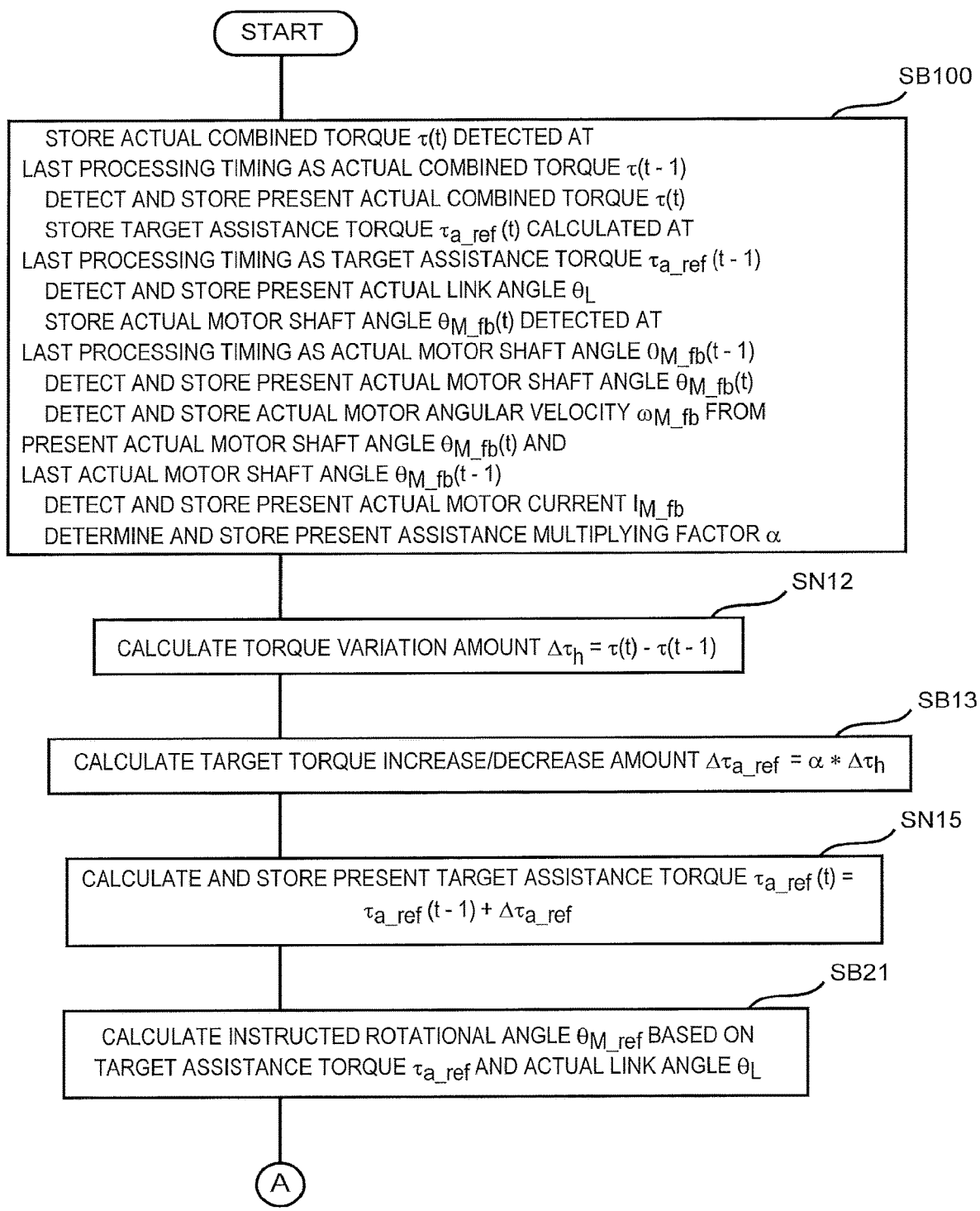
FIG. 16A is a part of flowchart illustrating a processing procedure based on the control block diagram illustrated in FIG. 15.
Figure 16B:
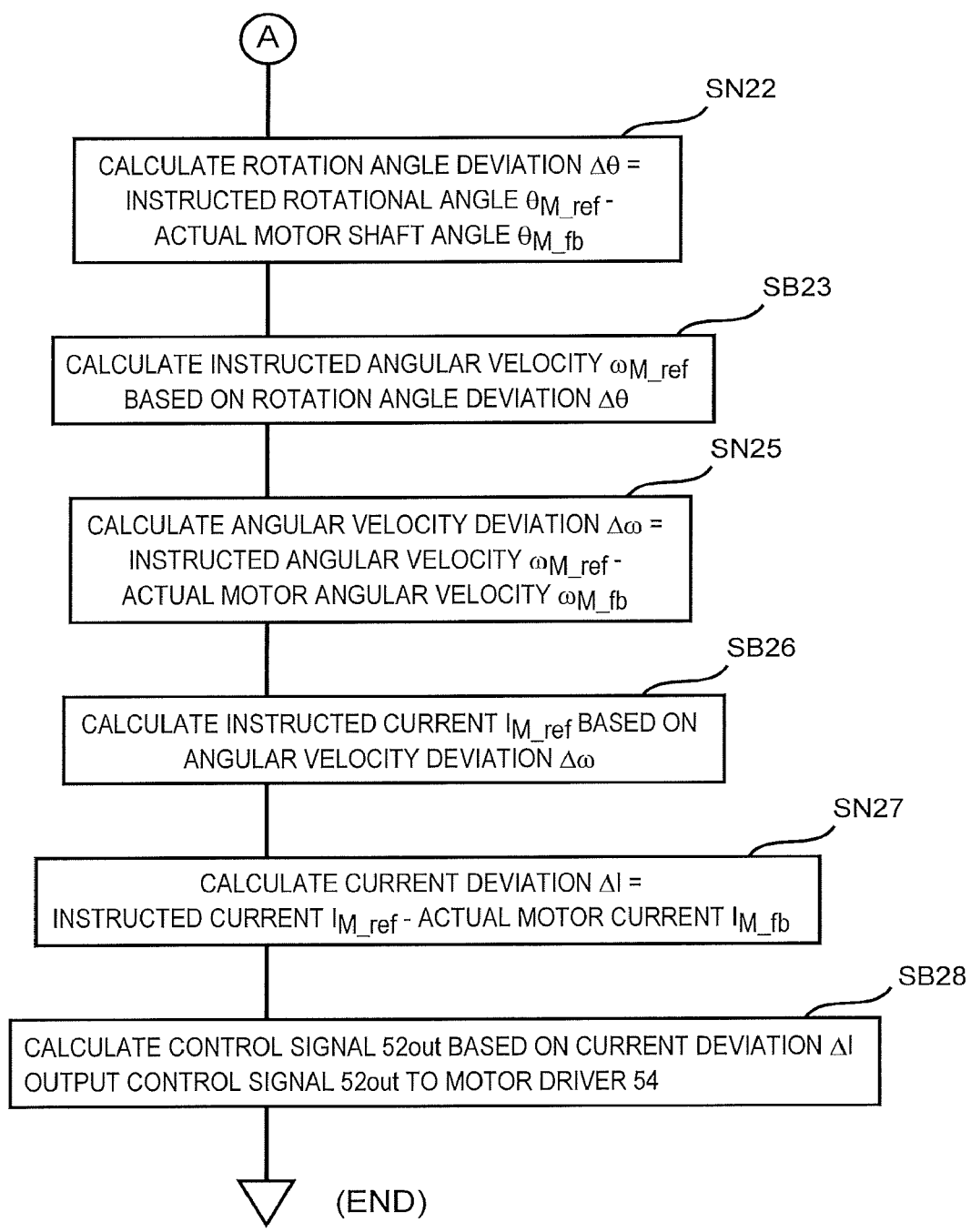
FIG. 16B is a part of flowchart illustrating a processing procedure based on the control block diagram illustrated in FIG. 15.
Figure 17:
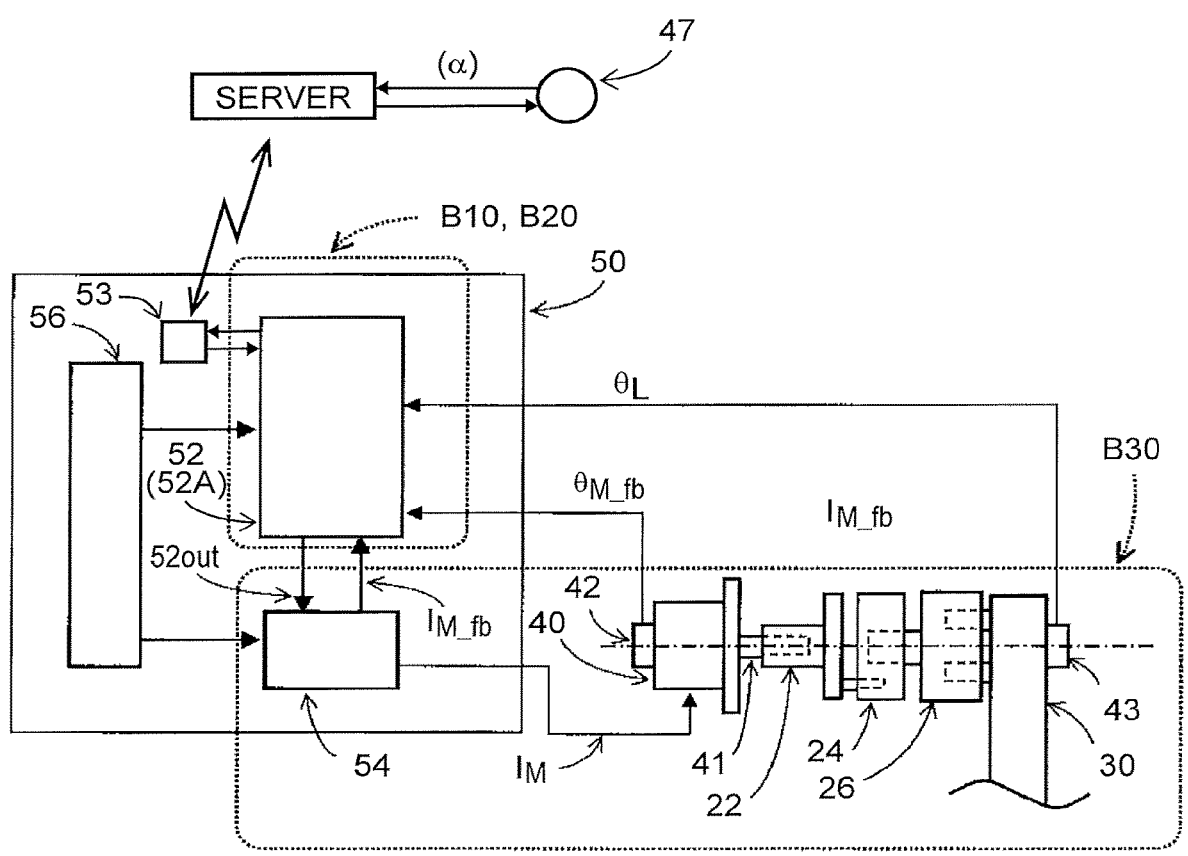
FIG. 17 is a diagram illustrating input/output to/from a controller according to a modified example of an assistance apparatus.

Next, a processing procedure in the controller 52 will be described with reference to the flowchart illustrated in FIG. 16A and FIG. 16B and the control block diagram illustrated in FIG. 15. Here, reference numeral B10 in the control block diagram illustrated in FIG. 15 is an assistance torque determination section B10 that calculates an assistance torque from the motor 40, and the controller 52 illustrated in FIG. 13 corresponds to the assistance torque determination section B10. Also, reference numeral B20 in the control block diagram illustrated in FIG. 15 is a motor control section B20 that determines a current for driving the motor 40, and the controller 52 illustrated in FIG. 13 corresponds to the motor control section B20. Also, reference numeral B30 in the control block diagram illustrated in FIG. 15 is a torque providing section B30 including the motor driver 54, the motor 40 (and the motor rotation angle detection section 42), the input member 22, the spiral spring 24, the reducer 26, the output link 30, the output link pivotal angle detection section 43 and the torque detection section 45, and the part indicated by reference numeral B30 in FIG. 13 corresponds to the torque providing section B30.

Next, the flowchart illustrated in FIGS. 16A and 16B will be described. The processing indicated in FIGS. 16A and 16B is started at a predetermined time interval (for example, an interval of several milliseconds), and upon start of the processing, the controller 52 advances the processing to step SB100.

Step SB100 includes processing corresponding to blocks B11, B14 and B24 in the control block diagram illustrated in FIG. 15 and input signal processing. In step SB100, the controller 52 stores an actual combined torque τ(t) detected and stored at a last processing timing, as a last actual combined torque τ(t-1) (processing corresponding to a block B11). Then, the controller 52 detects a present combined torque τ(t) based on a detection signal from the torque detection section 45 and stores the present combined torque τ(t) (input signal processing). Also, the controller 52 stores a target assistance torque $τ_{a\_ref}(t)$ calculated and stored at the last processing timing, as a last target assistance torque $τ_{a\_ref}(t-1)$ (processing corresponding to a block B14). Also, the controller 52 detects a present actual link angle $θ_L$ based on a detection signal from the output link pivotal angle detection section 43 and stores the present actual link angle $θ_L$ (input signal processing).

Also, the controller 52 stores an actual motor shaft angle $θ_{M\_fb}(t)$ detected and stored at the last processing timing, as a last actual motor shaft angle $θ_{M\_fb}(t-1)$. Then, the controller 52 detects and stores a present actual motor shaft angle $θ_{M\_fb}(t)$ based on a detection signal from the motor rotation angle detection section 42. Furthermore, the controller 52 calculates and stores an actual motor angular velocity ($\dotθ_{M\_fb}$ from the present actual motor shaft angle $θ_{M\_fb}(t)$ and the last actual motor shaft angle $θ_{M\_fb}(t-1)$ (processing corresponding to a block B24). Also, the controller 52 calculates and stores an actual motor current $I_{M\_fb}$ from a detection signal input from the motor driver 54. Also, the controller 52 determines and stores an assistance multiplying factor α based on a setting signal from the assistance multiplying factor varying section 47 (input signal processing).

Step SN12 corresponds to processing in a node N12 in the control block diagram illustrated in FIG. 15. In step SN12, the controller 52 calculates a difference between the present actual combined torque τ(t) and the last actual combined torque τ(t-1) input from the block B11 and outputs a calculated torque variation amount $Δτ_h$ to a block B13, and proceeds to step SB13. Also, the torque variation amount $Δτ_h$ corresponds to a subject person torque-related amount related to a subject person torque, the subject person torque-related amount being extracted from a combined torque τ, and is calculated according to (Expression 10) below. Here, an assistance torque output at a last calculation timing can be regarded as constant until output of a new assistance torque at a present calculation timing. Therefore, a variation amount (deviation) between the actual combined torque τ(t) at the present calculation timing and the actual combined torque τ(t-1) at the last calculation timing can be regarded as a variation amount (deviation) of a subject person torque input from a subject person. In other words, calculation of a difference between the present actual combined torque τ(t) that is a combination of a present subject person torque and an assistance torque and the last actual combined torque τ(t-1) enables calculation of a variation amount of the subject person torque with an effect of the assistance torque excluded.

$$Δτ_h = τ(t) - τ(t-1) \quad \text{(Expression 10)}$$

Step SB13 corresponds to processing in the block B13 in the control block diagram illustrated in FIG. 15. In step SB13, the controller 52 calculates an assistance increase/decrease amount $\Delta\tau_{a\_ref}$ by multiplying the torque variation amount $\Delta\tau_h$ input from the node N12 by the determined assistance multiplying factor α and outputs the calculated assistance increase/decrease amount $\Delta\tau_{a\_ref}$ to a node N15, and proceeds to step SN15. Here, the assistance multiplying factor α is a value in a range of 0<α<1. Also, the assistance increase/decrease amount $\Delta\tau_{a\_ref}$ is calculated according to (Expression 11) below.

$$\Delta\tau_{a\_ref} = \alpha * \Delta\tau_h \quad \text{(Expression 11)}$$

Step SN15 corresponds to processing in the node N15 in the control block diagram illustrated in FIG. 15. In step SN15, the controller 52 calculates the sum of the assistance increase/decrease amount $\Delta\tau_{a\_ref}$ input from the block B13 and the last target assistance torque $\tau_{a\_ref}(t-1)$ input from the block B14 and outputs the calculated target assistance torque $\tau_{a\_ref}$ to a block B21, and proceeds to step SB21. The target assistance torque $\tau_{a\_ref}(\tau_{a\_ref}(t))$ can be calculated according to (Expression 12) below. In other words, a present target assistance torque $\tau_{a\_ref}$ can be calculated based on a torque that is the subject person torque-related amount ($\Delta\tau_h$) multiplied by a predetermined multiplying factor (assistance multiplying factor (α)), and the last target assistance torque $\tau_{a\_ref}(t-1)$.

$$\tau_{a\_ref}(t) = \tau_{a\_ref}(t-1) + \alpha * \Delta\tau_h \quad \text{(Expression 12)}$$

Step SB21 corresponds to processing in the block B21 in the control block diagram illustrated in FIG. 15. In step SB21, the controller 52 calculates an instructed rotational angle $\theta_{M\_ref}$ for the rotation shaft 41 of the motor 40 based on the actual link angle $\theta_L$ and the target assistance torque $\tau_{a\_ref}$ input from the node N15. Then, the controller 52 outputs the calculated instructed rotational angle $\theta_{M\_ref}$ to a node N22 and proceeds to step SN22. Here, according to the below definitions, the instructed rotational angle $\theta_{M\_ref}$ can be expressed by (Expression 13) below. Then, as a result of reorganization of (Expression 13), (Expression 14) can be obtained. This instructed rotational angle $\theta_{M\_ref}$ corresponds to an output shaft rotational angle.

$\theta_{M\_ref}$: instructed rotational angle
$\tau_{a\_ref}$: target assistance torque
K: spring constant of spiral spring 24
$\theta_L$: actual link angle
na, nb: value corresponding to a reduction ratio at which when the input rotation member 26e of the reducer 26 makes nb revolutions, the output rotation member 26p makes na revolutions (na<nb)

$$\tau_{a\_ref} = na*K[na*\theta_L - \omega_{M\_ref}/nb)] \quad \text{(Expression 13)}$$

$$\theta_{M\_ref} = [(na^2*K*\theta_L - \tau_{a\_ref})*nb/(na*K)] \quad \text{(Expression 14)}$$

Step SN22 corresponds to processing in the node N22 in the control block diagram illustrated in FIG. 15. In step SN22, the controller 52 calculates a rotation angle deviation $\Delta\theta$ that is a difference between the instructed rotational angle $\theta_{M\_ref}$ input from the block B21 and the actual motor shaft angle $\theta_{M\_fb}$. Then, the controller 52 outputs the calculated rotation angle deviation $\Delta\theta$ to a block B23 and proceeds to step SB23. Here, the rotation angle deviation $\Delta\theta$ is calculated according to (Expression 15) below.

$$\Delta\theta = \theta_{M\_ref} - \theta_{M\_fb} \quad \text{(Expression 15)}$$

Step SB23 corresponds to processing in the block B23 in the control block diagram illustrated in FIG. 15. In step SB23, the controller 52 calculates an instructed angular velocity $\omega_{M\_ref}$ based on the rotation angle deviation $\Delta\theta$ input from the node N22, using, e.g., existing PID control. Then, the controller 52 outputs the calculated instructed angular velocity $\omega_{M\_ref}$ to a node N25 and proceeds to step SN25. Here, a procedure and method for calculating the instructed angular velocity $\omega_{M\_ref}$ from the rotation angle deviation $\Delta\theta$ are not specifically limited, and any procedure and method may be used for calculating the instructed angular velocity $\omega_{M\_ref}$.

Step SN25 corresponds to processing in the node N25 in the control block diagram illustrated in FIG. 15. In step SN25, the controller 52 calculates an angular velocity deviation $\Delta\omega$ that is a difference between the instructed angular velocity $\omega_{M\_ref}$ input from the block B23 and the actual motor angular velocity $\omega_{M\_fb}$ input from the block B24. Then, the controller 52 outputs the calculated angular velocity deviation $\Delta\omega$ to a block B26 and proceeds to step SB26. Here, the angular velocity deviation $\Delta\omega$ is calculated according to (Expression 16) below.

$$\Delta\omega = \omega_{M\_ref} - \omega_{M\_fb} \quad \text{(Expression 16)}$$

Step SB26 corresponds to processing in the block B26 in the control block diagram illustrated in FIG. 15. In step SB26, the controller 52 calculates an instructed current $I_{M\_ref}$ based on the angular velocity deviation $\Delta\omega$ input from the node N25, using, e.g., existing PID control. Then, the controller 52 outputs the calculated instructed current $I_{M\_ref}$ to a node N27 and proceeds to step SN27. Here, a procedure and method for calculating the instructed current $I_{M\_ref}$ from the angular velocity deviation $\Delta\omega$ are not specifically limited, and any procedure and method may be used to calculate the instructed current $I_{M\_ref}$.

Step SN27 corresponds to processing in the node N27 in the control block diagram illustrated in FIG. 15. In step SN27, the controller 52 calculates a current deviation $\Delta I$ that is a difference between the instructed current $I_{M\_ref}$ input from the block B26 and the actual motor current $I_{M\_fb}$. Then, the controller 52 outputs the calculated current deviation $\Delta I$ to a block B28 and proceeds to step SB28. Here, the current deviation $\Delta I$ is calculated according to (Expression 17) below.

$$\Delta I = I_{M\_ref} - I_{M\_fb} \quad \text{(Expression 17)}$$

Step SB28 corresponds to processing in the block B28 in the control block diagram illustrated in FIG. 15. In step SB28, the controller 52 calculates a control signal 52 out based on the current deviation $\Delta I$ input from the node N27, using, e.g., existing PID control. For example, the control signal 52 out is a control signal according to the motor driver 54 such as a PWM signal set so as to have a duty corresponding to the current deviation $\Delta I$. Then, the controller 52 outputs the calculated control signal 52 out to the motor driver 54 and ends the processing. Here, a procedure and method for calculating the control signal 52 out from the current deviation $\Delta I$ are not specifically limited, and any procedure and method may be used to calculate the control signal 52 out.

The assistance apparatuses 60, 10 described in the first and second embodiments above each serve to assist a subject person torque input from a subject person, based on a combined torque calculated by the calculation section 52A (functioning as a torque calculation section) of the controller 52, eliminating the need to attach a multitude of sensors to the skin of the subject person, and are thus easy to wear. Also, there is no need to perform processing of signals from the multitude of sensors attached to a plurality of sites on the subject person, and as illustrated in the block diagram in FIG. 7, input signals input from the controller 52 and the outside of the motor driver 54 are those of an actual link angle θL, which is a pivotal angle of an output link 30, and an actual motor shaft angle $θ_{M\_fb}$, which is a rotational angle of a rotation shaft 41 of a motor 40, and thus, only a small number of input signals are needed. Therefore, in comparison with the conventional body-worn motion support apparatuses, each of the assistance apparatuses 60, 10 has a simple configuration and is also very simple in terms of control.

Also, a very simple operation such as assisting a subject person torque input from a subject person is performed, and thus, there is no need to distinguish among respective motions such as a motion of lifting a heavy object up via movement of the upper arms of the subject person, a motion of lifting a heavy object up via bending of the waist and thighs of the subject person and a motion of walking via periodical movement of the thighs of the subject person, and thus, the operation can be performed with simple control. Also, there is no need to separately detect a subject person torque and an assistance torque and it is only necessary to calculate a combined torque, and thus, the number of sensors is reduced, enabling provision of a simpler configuration. Furthermore, the assistance multiplying factor α can arbitrarily be adjusted, which is very convenient in, e.g., rehabilitation. Also, the provision of a reducer enables use of a spiral spring having a relatively-small spring constant, enabling reduction in size and weight of the assistance apparatus.

Also, even where a plurality of forces (torques) are generated from a spiral spring 24 (elastic body) that stores and releases energy, a motor 40 (actuator) that provides assistance and an assistance subject person himself/herself and an uncomfortable force (torque) not intended by the assistance subject person himself/herself is generated, proper control can be performed taking the respective forces (torques) into consideration from, e.g., the rotational angle of an output link 30, and thus, generation of a uncomfortable force on the assistance subject person himself/herself can be suppressed.

Various alterations, additions and deletions in, e.g., structure, configuration, shape, outer appearance, processing procedure and arithmetic expressions can be made to an assistance apparatus according to the present disclosure without departing from the spirit of the present disclosure.

Use of the assistance apparatuses described in the above embodiments is not limited to assistance in movement of the upper arms or movement of the legs of a subject person, and the assistance apparatuses are applicable to various subjects.

Also, although the description of the above embodiments has been provided in terms of an example in which a reducer 26 is provided between an output link 30 and a spiral spring 24 and the spiral spring 24 is thereby indirectly connected to the output link 30, it is possible that the reducer 26 is omitted and the output link 30 and the spiral spring 24 are directly connected. Also, instead of the spiral spring 24, any of various elastic bodies can be used. For example, in the above embodiments, a spirally-wound spring is used; however, another type of spring such as a plate-like spring or a wave spring may be used. Also, an elastomer such as rubber or resin or an elastic body using liquid, such as oil, or gas may be used. The elastic body can be changed according to an amount of movement of a subject (motion) for which energy is stored and/or an amount of energy stored. Where the amount of stored energy is relatively small, use of an elastomer is effective. Also, use of a return spring is effective for, e.g., a motion of a person lifting a parcel up because of, e.g., the relatively-large energy storage amount, the magnitude of, e.g., the spring constant (rigidity) and the ease of adjustment (in the case of a spiral spring, ease of adjustment of, e.g., the number of turns of the spring and the diameter of the wire). Also, a return spring is advantageous from the viewpoint of cost.

Although the assistance apparatus 60 according to the first embodiment has been described in terms of an example in which an assistance mechanism and an output link 30 are provided on each of the right and left sides, an assistance mechanism and an output link 30 may be provided on either of the right and left sides. Also, although the assistance apparatus 10 according to the second embodiment has been described in terms of an example in which an assistance mechanism and an output link 30 are provided on each of the right and left sides, an assistance mechanism and an output link 30 may be provided on either of the right and left sides.

Also, a (wireless or wired) communication device 53 connected to the controller 52 may be included in, e.g., the control box 50, enabling transmission of data on a state of load (e.g., torque or motor current) on a subject person (worker) working in a predetermined production process to another analysis apparatus or operation device via a network connected to the communication device 53. The analysis apparatus or operation device can analyze the obtained data (on the load state). Then, the analysis apparatus or operation device can determine a value of an assistance multiplying factor α for adjusting an assistance amount according to capabilities (experience, physical strength, etc.) of the subject person (worker), the machine state of the assistance apparatus 60 (10) and/or the operation process in which the subject person works, from a result of the analysis, and transmit the value (determined assistance multiplying factor α) to the controller 52 of the control box 50 via the network. In other words, a proper assistance multiplying factor α for the subject person can automatically be calculated using, e.g., the analysis apparatus or operation device on the network, and the calculated assistance multiplying factor α can automatically be set for the subject person, and in this case, assistance multiplying factor varying section 47 functions as the analysis apparatus or operation device on the network. Therefore, the assistance multiplying factor α can automatically be changed in real time to a proper value according to the state of the subject person (worker), enabling further enhancement in work efficiency of the subject person (worker).

Also, although in the description of the above embodiments, attention is paid on the spiral springs 24 and a combined torque stored in each spiral spring 24 is calculated, a combined torque between an output link 30 and a reducer 26 may be calculated. Also, although in the description of the above embodiments, an instructed rotational angle $θ_{M\_ref}$ is an output shaft rotational angle, an actual motor shaft angle $θ_{M\_fb}$ may be an output shaft rotational angle.

Also, although in the description of the present embodiment, the calculation section 52A of the controller 52 is used as a torque calculation section, a torque detection section (e.g., a torque sensor) may be provided at a proper position such as a position between the output link 30 and the reducer 26 to determine a torque based on a detection signal from the torque detection section.

What is claimed is:

1. An assistance apparatus comprising:
 a body brace configured to be put on a periphery of an assistance subject body part of a subject person;

an output link configured to be put on the assistance subject body part, the output link pivoting about a joint in the assistance subject body part;

an actuator including an output shaft that is configured to generate an assistance torque for assisting pivoting of the assistance subject body part via the output link;

a torque detection section provided at any position on a way from the output link to the output shaft, the torque detection section including an output shaft rotational angle sensor configured to detect an output shaft rotational angle that is a rotational angle of the output shaft, an output link pivotal angle detection sensor configured to detect an output link pivotal angle that is a pivotal angle of the output link, and an elastic body along an axial direction of the output shaft between the output shaft rotational angle sensor and the output link pivotal angle detection sensor;

a torque calculation section configured to determine a combined torque that is a combination of a subject person torque input from the output link as a result of the subject person making the assistance subject body part pivot with the subject person's own strength and the assistance torque from the output shaft and the elastic body; and a controller configured to control a rotational angle of the output shaft based on the combined torque determined using the torque calculation section.

2. The assistance apparatus according to claim 1, wherein the controller is configured to control the output shaft rotational angle based on the combined torque determined using the torque calculation section and the output link pivotal angle detected using the output link pivotal angle sensor.

3. The assistance apparatus according to claim 2, wherein:
the torque detection section includes at least one of a current sensor configured to detect a drive current for the actuator and a rotation speed sensor configured to detect a rotation speed of the actuator; and
the torque calculation section is configured to
i) detect the assistance torque based on at least one of the drive current detected using the current sensor or the rotation speed detected using the rotation speed sensor, and
ii) calculate the subject person torque based on the combined torque and the assistance torque.

4. The assistance apparatus according to claim 2, wherein the torque calculation section is a calculation section in the controller, and the controller is configured to calculate the combined torque based on the output link pivotal angle, the output shaft rotational angle and a state of the elastic body.

5. The assistance apparatus according to claim 2, wherein the controller is configured to
i) calculate a subject person torque-related amount related to the subject person torque from the determined combined torque,
ii) calculate the assistance torque according to the calculated subject person torque-related amount,
iii) calculate the output shaft rotational angle based on the calculated assistance torque, and
iv) control the actuator so as to achieve the calculated output shaft rotational angle.

6. The assistance apparatus according to claim 5, wherein the controller is configured to calculate the assistance torque based on a torque obtained by multiplying the subject person torque-related amount by a predetermined multiplying factor, the assistance apparatus further comprising an assistance multiplying factor varying section configured to vary the predetermined multiplying factor.

7. The assistance apparatus according to claim 2, wherein the elastic body is a spiral spring, the output shaft is connected to one end of the spiral spring, and the output link is connected to another end of the spiral spring directly or via a predetermined member.

8. The assistance apparatus according to claim 7, wherein:
the predetermined member is a reducer configured to reduce a speed of rotation output from the spiral spring and transmit the rotation with the reduced speed to the output link; and
the torque calculation section is configured to determine the combined torque between the output link and the reducer or the combined torque stored in the spiral spring.

9. The assistance apparatus according to claim 6, wherein the controller is configured to
i) determine the combined torque and calculate the output shaft rotational angle and control the actuator so as to achieve the calculated output shaft rotational angle, at a calculation timing that comes at a predetermined time interval set in advance, and
ii) at a present calculation timing, calculate a present assistance torque that is an assistance torque at the present calculation timing based on a deviation between a present combined torque that is a combined torque determined at the present calculation timing and a last combined torque that is a combined torque determined at a last calculation timing, a last assistance torque that is an assistance torque calculated at the last calculation timing, and the predetermined multiplying factor.

10. The assistance apparatus according to claim 9, wherein:
the elastic body is a spiral spring, the output shaft is connected to one end of the spiral spring, a reducer configured to reduce a speed of rotation output from the spiral spring and transmits the rotation with the reduced speed to the output link is connected to another end of the spiral spring; and
the controller is configured to calculate the output shaft rotational angle based on the present assistance torque, a reduction ratio of the reducer, a spring constant of the spiral spring and the output link pivotal angle.

11. The assistance apparatus according to claim 1, further comprising:
a communication device that is configured to be connected to the controller and is configured to transmit data on a state of load on the subject person working in a predetermined production process to a network; and
an assistance multiplying factor varying section that is configured to be connected to the communication device via the network, the assistance multiplying factor varying section being configured to obtain the data on the state of load on the subject person and analyze the obtained data.

12. The assistance apparatus according to claim 11, wherein the assistance multiplying factor varying section is configured to calculate an assistance amount, from a result of the analysis, according to at least one value from one or more of the following categories: i) capabilities of the subject person; ii) a machine state of the assistance apparatus; and iii) an operation process in which the subject person works.

13. The assistance apparatus according to claim 12, wherein the controller is configured to control the rotational angle of the output shaft.

14. The assistance apparatus according to claim 1, wherein the elastic body stores the store assistance torque from the output shaft and releases stored assistance torque as a pivoting force for the output link.

\* \* \* \* \*